(12) United States Patent
Izu et al.

(10) Patent No.: US 11,414,220 B2
(45) Date of Patent: Aug. 16, 2022

(54) HEAT RADIATOR USING HEAT PIPE PANEL

(71) Applicant: Mitsubishi Electric Corporation, Chiyoda-ku (JP)

(72) Inventors: Hiroki Izu, Chiyoda-ku (JP); Yuichi Ogura, Chiyoda-ku (JP); Takehide Nomura, Chiyoda-ku (JP); Kengo Hayashi, Chiyoda-ku (JP); Shintaro Yamashita, Chiyoda-ku (JP); Shiro Sakata, Chiyoda-ku (JP); Tetsuya Kitagawa, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 269 days.

(21) Appl. No.: 16/080,213

(22) PCT Filed: Feb. 1, 2017

(86) PCT No.: PCT/JP2017/003642
§ 371 (c)(1),
(2) Date: Aug. 27, 2018

(87) PCT Pub. No.: WO2017/169080
PCT Pub. Date: Oct. 5, 2017

(65) Prior Publication Data
US 2019/0071193 A1    Mar. 7, 2019

(30) Foreign Application Priority Data

Mar. 31, 2016 (JP) .............................. JP2016-071211

(51) Int. Cl.
*B64G 1/50* (2006.01)
*F28D 15/02* (2006.01)
(Continued)

(52) U.S. Cl.
CPC ............. *B64G 1/506* (2013.01); *B64G 1/503* (2013.01); *B64G 1/58* (2013.01); *F28D 15/02* (2013.01);
(Continued)

(58) Field of Classification Search
CPC .......... B64G 1/50; B64G 1/503; B64G 1/506; B64G 1/58; F28D 15/02; F28D 15/0241; F28D 15/043
(Continued)

(56) References Cited

U.S. PATENT DOCUMENTS 3,384,324 A * 5/1968 O'Sullivan, Jr. ........ F24S 50/80
244/171.8
4,880,050 A * 11/1989 Nakamura ............... B64G 1/50
165/41
(Continued)

FOREIGN PATENT DOCUMENTS

| JP | 58-2593 A | 1/1983 |
| JP | 62-261598 A | 11/1987 |

(Continued)

OTHER PUBLICATIONS

International Search Report dated Mar. 7, 2017 in PCT/JP2017/003642 filed Feb. 1, 2017.
(Continued)

*Primary Examiner* — Tho V Duong
(74) *Attorney, Agent, or Firm* — Oblon, McClelland, Maier & Neustadt, L.L.P.

(57) ABSTRACT

Inner panels including at least one built-in heat pipe connected in a circumferential direction are provided. In a heat pipe panel including the built-in heat pipe, apparatuses are mounted on the outer side of the plural inner panels connected in the circumferential direction to diffuse generated heat of the apparatuses to the circumferential direction of the
(Continued)

inner panels. Webbed panels including a built-in heat pipe horizontally arranged and having heat radiation surfaces are radially arranged at corners of the inner panels as well as a heat pipe is horizontally built in and heat radiation surfaces are arranged also on outer panels facing the inner panels to thermally connect the heat pipes to one another.

12 Claims, 36 Drawing Sheets

(51) Int. Cl.
*B64G 1/58* (2006.01)
*F28D 15/04* (2006.01)

(52) U.S. Cl.
CPC ....... *F28D 15/0241* (2013.01); *F28D 15/043* (2013.01); *F28D 15/0233* (2013.01); *F28D 15/046* (2013.01)

(58) Field of Classification Search
USPC .................................................. 165/104.26
See application file for complete search history.

(56) References Cited

U.S. PATENT DOCUMENTS

| | | | |
|---|---|---|---|
| 5,351,746 A | 10/1994 | Mackey et al. | |
| 5,372,183 A * | 12/1994 | Strickberger | B64G 1/503 165/41 |
| 5,506,032 A * | 4/1996 | Rowe | F28D 15/0233 428/178 |
| 6,206,327 B1 | 3/2001 | Benedetti et al. | |
| 6,378,809 B1 | 4/2002 | Pon | |
| 6,478,258 B1 * | 11/2002 | Yee | B64G 1/503 165/41 |
| 6,591,899 B1 * | 7/2003 | Yee | B64G 1/506 165/104.14 |
| 6,626,231 B2 * | 9/2003 | Cluzet | B64G 1/503 165/41 |
| 6,778,389 B1 * | 8/2004 | Glovatsky | H01L 25/065 165/80.1 |
| 7,513,462 B1 * | 4/2009 | McKinnon | B64G 1/1007 244/173.1 |
| 8,240,612 B2 * | 8/2012 | Jondeau | B64G 1/506 244/171.8 |
| 2002/0145082 A1 | 10/2002 | Bertheux et al. | |
| 2010/0223942 A1 | 9/2010 | Merino et al. | |
| 2011/0001013 A1 * | 1/2011 | Torres Sepulveda | B64G 1/506 244/171.8 |
| 2013/0170020 A1 | 7/2013 | Davis | |
| 2013/0200221 A1 * | 8/2013 | Goodzeit | B64G 1/506 244/171.8 |
| 2015/0122454 A1 | 5/2015 | Houghton | |
| 2016/0341857 A1 | 11/2016 | Davis | |

FOREIGN PATENT DOCUMENTS

| | | |
|---|---|---|
| JP | 1-212698 A | 8/1989 |
| JP | 1-144671 U | 10/1989 |
| JP | 1-148998 U | 10/1989 |
| JP | 3-61199 A | 3/1991 |
| JP | 4-122703 U | 11/1992 |
| JP | 6-191500 A | 7/1994 |
| JP | 2002-513364 A | 5/2002 |
| JP | 2002-308199 A | 10/2002 |
| JP | 2003-137199 A | 5/2003 |
| JP | 2010-208628 A | 9/2010 |
| JP | 2012-504522 A | 2/2012 |
| JP | 2013-233906 A | 11/2013 |
| JP | 2015-513492 A | 5/2015 |
| JP | 2015-522459 A | 8/2015 |

OTHER PUBLICATIONS

Extended European Search Report dated Mar. 4, 2019 in European Patent Application No. 17773629.5, citing document AA therein, 8 pages.
Office Action dated Jul. 9, 2019 in Japanese Patent Application No. 2018-508475 with unedited computer generated English translation, 8 pages.
Office Action dated Feb. 5, 2019 in Japanese Patent Application No. 2018-508475, citing documents AO and AP therein, 8 pages (with unedited computer generated English translation).

* cited by examiner (A)

10 : CONNECTED HEAT PIPE PANEL (B)

10 : CONNECTED HEAT PIPE PANEL

VIEW AS SEEN FROM ARROW D

VIEW AS SEEN FROM ARROW E

14 : CONNECTED HEAT PIPE PANEL

14 : CONNECTED HEAT PIPE PANEL

VIEW AS SEEN FROM ARROW F

VIEW AS SEEN FROM ARROW H (A)

20 : CONNECTED HEAT PIPE PANEL (B)

20 : CONNECTED HEAT PIPE PANEL

VIEW AS SEEN FROM ARROW J

VIEW AS SEEN FROM ARROW K

VIEW AS SEEN FROM ARROW L

VIEW AS SEEN FROM ARROW P

36 : CONNECTED HEAT PIPE PANEL

6 : CONNECTED HEAT PIPE PANEL

6 : CONNECTED HEAT PIPE PANEL

10 : CONNECTED HEAT PIPE PANEL

20 : CONNECTED HEAT PIPE PANEL

20 : CONNECTED HEAT PIPE PANEL

24 : CONNECTED HEAT PIPE PANEL

HEAT RADIATOR USING HEAT PIPE PANEL

TECHNICAL FIELD

In an artificial satellite and a spacecraft, mechanical system design such as thermal structure design and equipment layout design is performed in accordance with apparatuses mounted on the inside and conditions such as an orbit and attitude at the time of putting the satellite or the spacecraft. Therefore, when design conditions differ, the design also differs respectively. The present invention relates to a heat radiator using a connected heat pipe panel in which structure panels in which heat pipes are built are connected in the artificial satellite or the spacecraft, to which the same mechanical system design can be applied even when apparatuses to be mounted or orbit and attitude conditions differ, which can standardize design.

BACKGROUND ART

In the artificial satellite and the spacecraft, apparatuses to be mounted and orbit and attitude conditions differ according to respective missions, therefore, thermal structure design and equipment layout design for mounting respective apparatuses have to be performed every time. For example, in thermal structure design of a satellite, heat generation apparatuses are mounted on inner surfaces of satellite structure panels suitable to heat radiation with a small input of orbit heat such as solar light so as to correspond to heat generation in the mounted apparatuses and thermal environment conditions on the orbit, and heat radiation surfaces with a suitable size are provided on opposite surfaces on the space side to thereby radiate heat generated in the apparatuses to the space. Accordingly, when mounted apparatuses or orbit and attitude conditions change and the heat generation of apparatuses inside the satellite or thermal environment conditions on the orbit change, it is necessary to change design in equipment layout, layout and the size of the heat radiation surfaces.

As the heat input of solar light is small on south and north surfaces of the satellite in cases of geostationary satellites such as a communication satellite and a weather observation satellite, these surfaces are suitable for radiating heat generated in apparatuses inside the satellite to the space (see FIG. 23). Accordingly, a satellite bus in which the south and north surfaces are main heat radiation surfaces is standardized in geostationary satellites in major satellite manufacturers. As a geostationary orbit above the equator has an angle of inclination of approximately 23.4 degrees with respect to the ecliptic, solar light corresponding to the angle of inclination is incident on the south or north surfaces of the geostationary satellite, and heat radiating ability is reduced in the south surface or the north surface receiving the solar light. As countermeasures for that, a technique of south-north connected heat pipes for preventing the reduction in heat radiation ability by connecting the south and north surfaces by heat pipes has been invented in the past (for example, see Patent Literature 1).

However, it is difficult to apply the technique of the standardized satellite bus and the technique of the south-north connected heat pipes to a low orbit satellite or a spacecraft having different orbit and attitude conditions and not having a concept of the south and north surfaces though these technique may be applied to geostationary satellites in which heat input of solar light to the south and north surfaces is small. As main heat radiation surfaces are limited to two surfaces that are south and north surfaces, a mounting area of heat generation apparatuses is subject to constraints in the area of the south and north panels. Satellite structure surfaces other than the south and north surfaces such as east and west surfaces receive a large heat input of solar light and are not suitable for radiating heat, therefore, a heat radiation problem occurs when apparatuses are mounted on surfaces other than south and north surfaces. Even when the south and north panels are formed to be as large as possible to extend an apparatus mounting area, it is necessary to suppress the size of the satellite within a dimension of a fairing of a launch rocket, therefore, the area have to be extended within the range and the geostationary satellite bus currently has a problem that apparatus mountability and heat radiation ability are subject to constraints in the area of the south and north panels.

As a countermeasure for solving the above problems concerning the geostationary bus, in order to improve heat radiation ability on the south and north surfaces, a technique of an expandable radiator in which a heat radiation panel folded at the time of launching is expanded to the south surface side and the north surface side respectively on the orbit to extend the area of the south and north surfaces and increase heat radiation ability is disclosed (for example, see Patent Literatures 2 and 3).

However, an expansion mechanism is necessary for the expandable radiator and an advanced heat transport device having flexible piping called a loop heat pipe that transports heat to the expanded radiator is also necessary. The expandable radiator has a problem on reliability that it is difficult to radiate heat when the expansion mechanism or the loop heat pipe fails.

As another countermeasure, there is also an idea that east and west surfaces of the geostationary satellite are connected by the heat pipe, and heat generation apparatuses are mounted on the east and west surfaces and when solar light is incident on the east (or west) surface, heat is transported to the opposite west (east) surface to radiate heat. However, the existing geostationary satellite bus uses the east and west surfaces as access panels for getting access to the inside of the satellite at the time of mounting or exchanging apparatuses, therefore, the east and west surfaces are not capable of being used as the access panels when apparatuses or the connected heat pipe is provided on the east and west panels, which causes a problem of workability.

As described above, it is difficult to apply the current geostationary satellite bus to the low orbit satellite and the spacecraft, and there are also problems in improvement of apparatus mountability and heat radiation ability of the geostationary satellite.

Furthermore, in a thermal vacuum test for checking performance or performing verification of a fuselage in a terrestrial environment in which a thermal vacuum state of the space is simulated, thermal design in respective fuselages and in respective fuselage surfaces differs, therefore, a heater for the test for setting thermal environment conditions of respective surfaces with respect to each fuselage and jigs supporting the heater are individually necessary, and a number of test jigs become necessary for each fuselage. It is also necessary to set the fuselage having heat pipes in a horizontal position for allowing the heat pipes to operate during the test, and the geostationary satellite in which heat pipes arranged in a lattice state on the south and north panels are built needs to be set by laying the satellite sideways so that the south and north panels are in horizontal positions. As described above, jigs, setting methods and the like in the thermal vacuum test differ according to each satellite under the circumstances.

CITATION LIST

Patent Literature

Patent Literature 1: JP-A-H6-191500
Patent Literature 2: JP-A-2002-513364
Patent Literature 3: JP-A-2002-308199

SUMMARY OF INVENTION

Technical Problem

As described above, in the existing system in which the apparatuses are mounted inside the structure panels and the heat radiation surfaces are provided on the surfaces on the space side opposite to the panels to radiate heat generated in the apparatuses to the space, the heat generation in apparatuses or conditions of an input of orbit heat differ according to each structure panel on which apparatuses are mounted, and it is necessary to design equipment layout, the heat pipe, the heat radiation surface, the heater and so on according to each fuselage or each structure panel of respective surfaces of the fuselage. Accordingly, there are problems that it is difficult to standardize design and that a development period and costs are increased.

The present invention has been made for solving the above problems and an object thereof is to provide a heat radiation structure capable of standardizing mechanical system design and reducing the development period and costs.

Solution to Problem

A heat radiation structure according to the present invention includes an inner panel arranged around a structure of an artificial satellite or a structure of a spacecraft in which at least one heat pipe connected in a circumferential direction is built.

Advantageous Effects of Invention

According to the present invention, the same thermal structure design and equipment layout design can be applied in design of the artificial satellite and the spacecraft even when apparatuses to be mounted or conditions of an orbit and attitude at the time of putting the satellite or the spacecraft differ, thereby obtaining advantages that mechanical system design is standardized and the development period and costs can be reduced. It is possible to use the same design in heat pipes, heat radiation surfaces and heaters particularly in thermal design even when heat input conditions vary due to differences in orbit and attitude conditions and in apparatuses to be mounted. Moreover, inner panels on which apparatuses are mounted are thermally connected by heat pipes, therefore, if a certain apparatus is turned off and the temperature is reduced, excessive reduction in temperature can be prevented by heat generation of other apparatuses, and heat generation of apparatuses can be used as a heater, which can reduce the power for the heater and heater systems.

DESCRIPTION OF EMBODIMENTS

Figure 1:
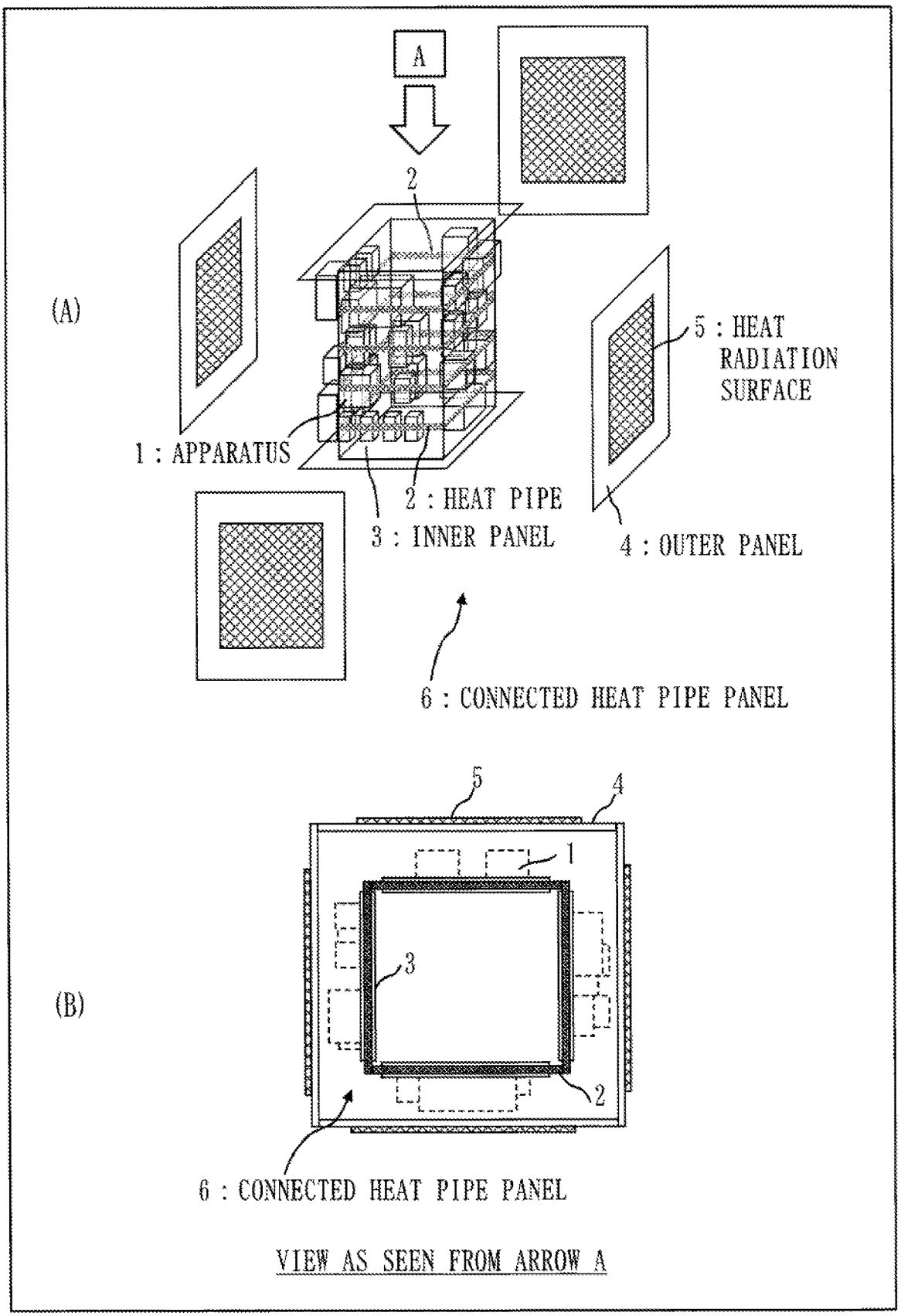
FIG. 1 is a structure view of a heat radiator including a connected heat pipe panel 6 according to Embodiment 1. (A) of FIG. 1 is a perspective view illustrating a state where outer panels 4 are removed from the heat radiator and is the perspective view drawn so that internal components are seen. (B) of FIG. 1 is a view of the heat radiator as seen in a direction of an arrow A in (A) of FIG. 1.

In mechanical system design such as thermal structure design and equipment layout design in the artificial satellite and the spacecraft, there are the following problems in addition to the above-described related art problems.

As one of the problems, due to the structure in which apparatuses are mounted inside the structure panels, it is necessary to temporarily remove the entire structure panel on which apparatuses as working targets are mounted or to provide an access panel or an access hole for getting access to apparatuses or the like afterward when apparatuses and harnesses are mounted or exchanged, which causes a problem that workability is not good.

Moreover, it is necessary to reduce the moment of inertia (MOI) in a satellite requiring high agility. However, in the existing system in which the apparatuses are mounted inside the structure panels and the heat radiation surfaces are provided on surfaces on the space side opposite to the panels, the apparatuses are mounted at positions apart from the center of gravity of the fuselage, and it is necessary to provide a working space inside the satellite in preparation for exchanging the apparatuses and the like, therefore, there are problems that it is difficult to mount apparatuses at high density and thus it is difficult to realize reduction of MOI and high agility.

In the geostationary satellite on which many heat generation apparatuses are mounted on the south and north panels as main heat radiation surfaces in which heat pipes are built in a lattice state, it is difficult to mount many heat generation apparatuses on panels other than the south and north panels and increase the heat radiation surfaces on panels other than the south and north panels, which causes a problem in improvement of apparatus mountability and heat radiation ability.

Also, heat input conditions are set in accordance with design of respective fuselages or respective surfaces of the fuselage in the thermal vacuum test, therefore, test jigs such as a heater for the test are necessary for each fuselage and thus a number of test jigs become necessary. Therefore, design/manufacture of new jigs, test preparation work and setting/adjustment work during the test are necessary for each test, which causes a problem that the test is not capable of being standardized and costs a lot.

Also in the thermal vacuum test of the geostationary satellite, it is necessary to lay the satellite sideways for allowing the heat pipes arranged in a lattice state inside the south and north panels to operate in the horizontal position, and work or test jigs are necessary for that, which causes problems in workability and that it is not possible to standardize test jigs between geostationary satellites and low orbit satellites or the like.

When adopting the heat radiator according to embodiments of the present invention, the following advantages can be also obtained.

In the case where the apparatuses or harnesses are mounted or exchanged, it is possible to get access to the apparatuses or harnesses as working targets by removing only an outer panel on the outer side, therefore, an advantage that workability is improved can be obtained.

As the apparatuses can be mounted on the inside close to the gravity center of the fuselage at high density, advantages that the MOI is reduced and high agility can be realized are obtained.

Furthermore, the apparatuses can be arranged on surfaces facing the space, which are other than inner surfaces of the structure panels, and the apparatuses and heat radiation surfaces can be arranged on structure panels other than the south and north surfaces in the geostationary satellite, therefore, an advantage that the apparatus mounting area and heat radiation ability can be increased as compared with related-art design can be obtained.

As heat is diffused and averaged in the circumferential direction of the fuselage axis, it is not necessary to set complicated heat input so as to correspond to design of respective surfaces of the fuselage in the thermal vacuum test. As a result, thermal environment on the orbit around the fuselage can be set by using a shroud (wall surface) temperature adjustment function and so on provided in a facility of the thermal vacuum test, and jigs such as the heater for the test are not necessary. Therefore, thermal environment on the orbit in various fuselages can be set without using jigs such as the heater for the test, which realizes standardization of the thermal vacuum test, labor saving in test work and reduction of costs.

Furthermore, the heat pipes are arranged in an orthogonal (horizontal) direction with respect to the axis (gravity) direction, therefore, it is not necessary to lay the satellite sideways for allowing the heat pipes to operate in the thermal vacuum test of the geostationary satellite, which can improve workability at the time of thermal vacuum test and can standardize jigs for setting the satellite.

Hereinafter, a heat radiation structure according to the present invention will be explained along Embodiments 1 to 8.

Embodiment 1

As a heat radiator according to Embodiment 1, a heat radiator having a hexahedral fuselage shape in which a plurality of heat pipes arranged and built in an orthogonal (horizontal) direction with respect to a direction of a fuselage axis (gravity) are connected in a circumferential direction to be isothermal and heat is radiated to the space from heat radiation surfaces provided on outer panels in a connected heat pipe panel having a structure in which inner panels to which apparatuses are installed have four surfaces in a tubular shape will be explained.

Though a term of satellite will be used in the following explanation, the term of satellite may be replaced with an artificial satellite or a spacecraft.

FIG. 1 is a structure view of a heat radiator including a connected heat pipe panel 6 according to Embodiment 1. In FIG. 1, 1 denotes apparatuses such as electronic apparatuses mounted on the satellite, 2 denotes heat pipes built in inner panels 3, 3 denotes the inner panels on which the apparatuses 1 are mounted, 4 denotes outer panels on an outer side of the satellite and 5 denotes heat radiation surfaces of the outer panels 4. The inner panels 3 with four surfaces are arranged along a periphery of a satellite structure. In the satellite, the apparatuses 1 are mounted on outer surfaces of the inner panels 3 facing inner surfaces of the outer panels 4 between the inner panels 3 and the outer panels 4.

Figure 2:
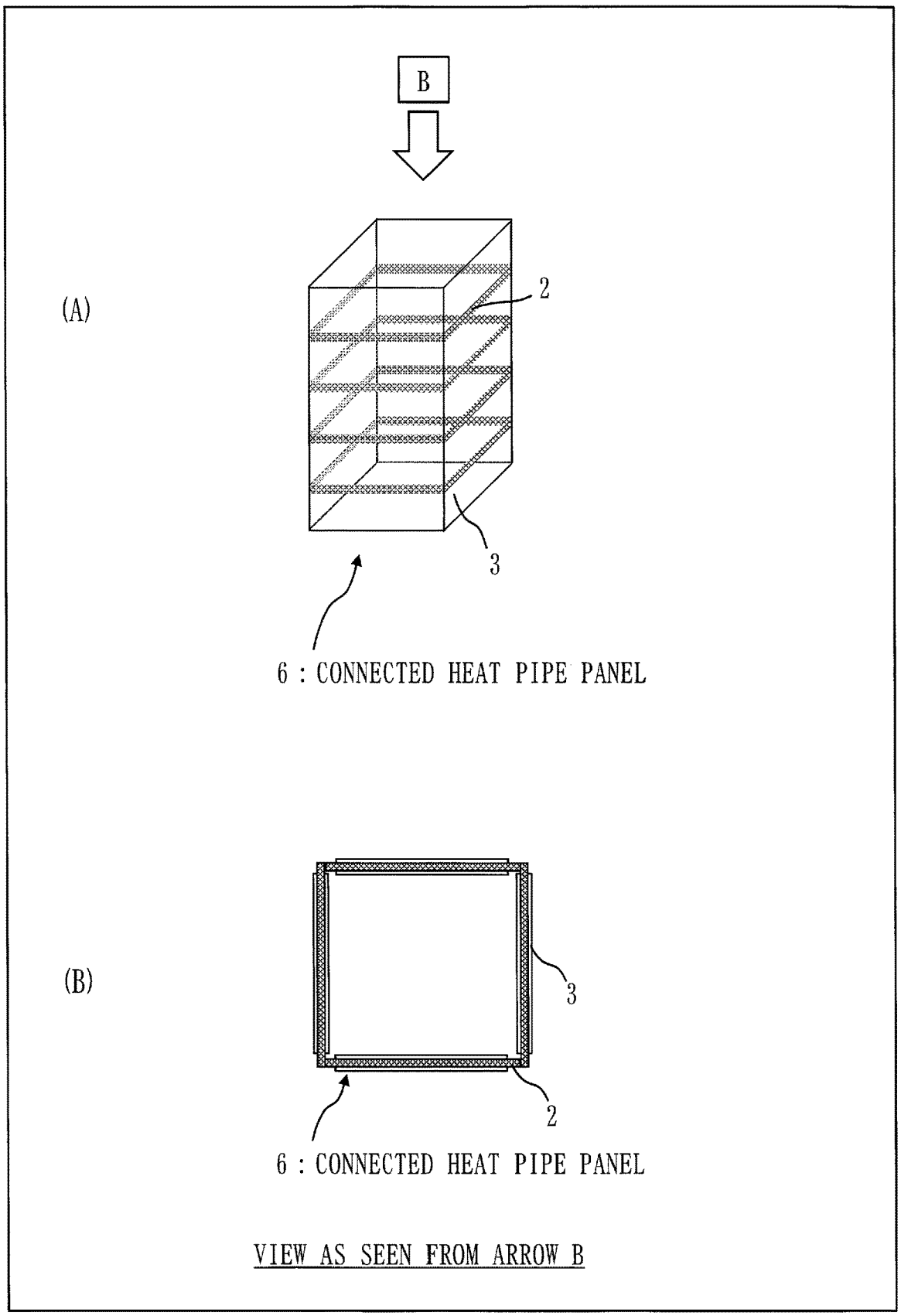
FIG. 2 is a structure view of the connected heat pipe panel 6 according to Embodiment 1. (A) of FIG. 2 is a perspective view of the connected heat pipe panel 6. (B) of FIG. 2 is a view of the connected heat pipe panel 6 as seen in a direction of an arrow B in (A) of FIG. 2.

FIG. 2 is a structure view of the connected heat pipe panel 6 according to Embodiment 1, illustrating only the connected heat pipe panel 6 from the drawing in FIG. 1.

The connected heat pipe panel 6 has a tubular shape in which inner panels 3 with four surfaces and heat pipes 2 embedded horizontally inside the inner panels 3 are thermally connected in a circumferential direction.

Figure 21:
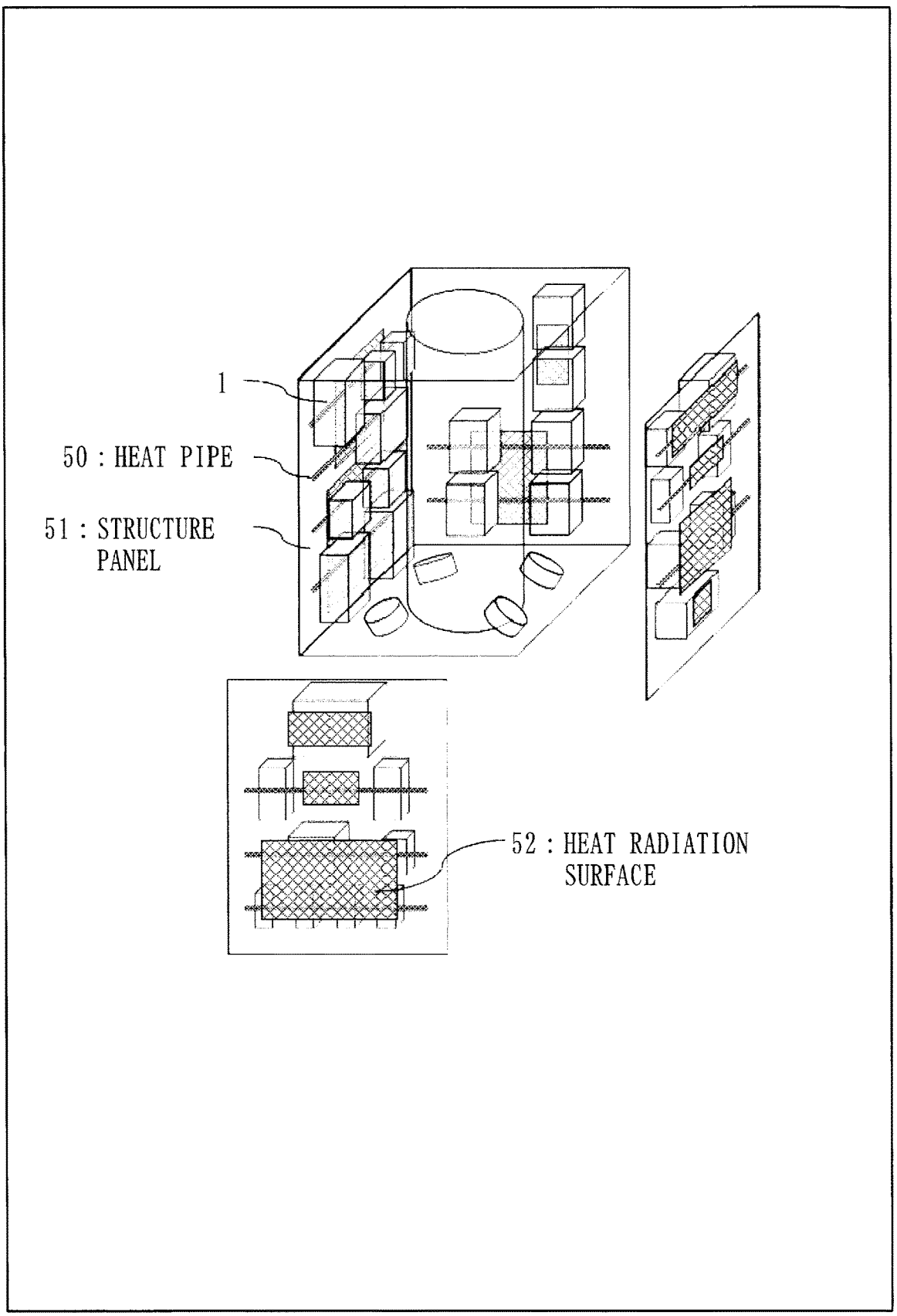
FIG. 21 is a view illustrating a related-art heat radiator of an artificial satellite having a hexahedral shape.

Note that FIG. 21 is a view illustrating a related-art heat radiator of an artificial satellite having a hexahedral shape, in which heat generated in the apparatuses mounted inside the satellite is radiated to the space by using heat radiation surfaces 52 on structure panels 51 in which heat pipes 50 are built inside the respective structure panels.

Next, the operation will be explained with reference to FIG. 1 and FIG. 2.

Heat generated in the plural apparatuses 1 attached to the inner panels 3 is diffused in a circumferential direction of the connected heat pipe panel 6 through the heat pipes 2, then, the heat is transmitted to the outer panels 4 by radiation and is radiated from the heat radiation surfaces 5 provided on the space side of the outer panels 4 to the space.

The heat radiation surfaces 5 have surface characteristics with a low absorption rate of solar light and a high thermal emissivity.

The shape, size and layout of the heat radiation surfaces 5 on the outer panels 4 are not limited to the illustrated shape, size and layout.

The heat pipes 2 horizontally arranged and built in the inner panels 3 may be arranged anywhere as long as these pipes have a positional relationship in which they are connected one another, and the number of pipes is not specified.

As described above, the connected heat pipe panel 6 according to Embodiment 1 is characterized in that the heat pipes 2 horizontally arranged and built in the inner panels 3 are thermally connected at plural places in the circumferential direction.

According to the above, the same thermal structure design and equipment layout design can be applied even when apparatuses to be mounted or conditions of an orbit and attitude at the time of putting the satellite differ, thereby standardizing mechanical system design and reducing a development period and costs.

The satellite vibrates by receiving a high sound pressure of a rocket at the time of launch, and the apparatus mounted panels directly receive the sound pressure of the rocket and vibrate in the related-art system in which apparatuses are mounted on the inner side of the structure panels. Whereas in the heat radiator according to Embodiment 1, the outer panels 4 directly receive the sound pressure of the rocket, therefore, the inner panels 3 on which the apparatuses 1 are mounted indirectly receive the sound pressure, therefore, acoustic environment of the mounted apparatuses 1 at the time of launch is alleviated.

Embodiment 2

In Embodiment 2, a heat radiator having a hexahedral fuselage shape in which webbed panels in which heat pipes are built are added with respect to Embodiment 1 and a connected heat pipe panel includes inner panels, webbed panels and heat radiation surfaces provided on the webbed panels will be explained.

Hereinafter, items different from those in Embodiment 1 will be chiefly explained. Items explanation of which is omitted are the same as those in Embodiment 1.

Figure 3:
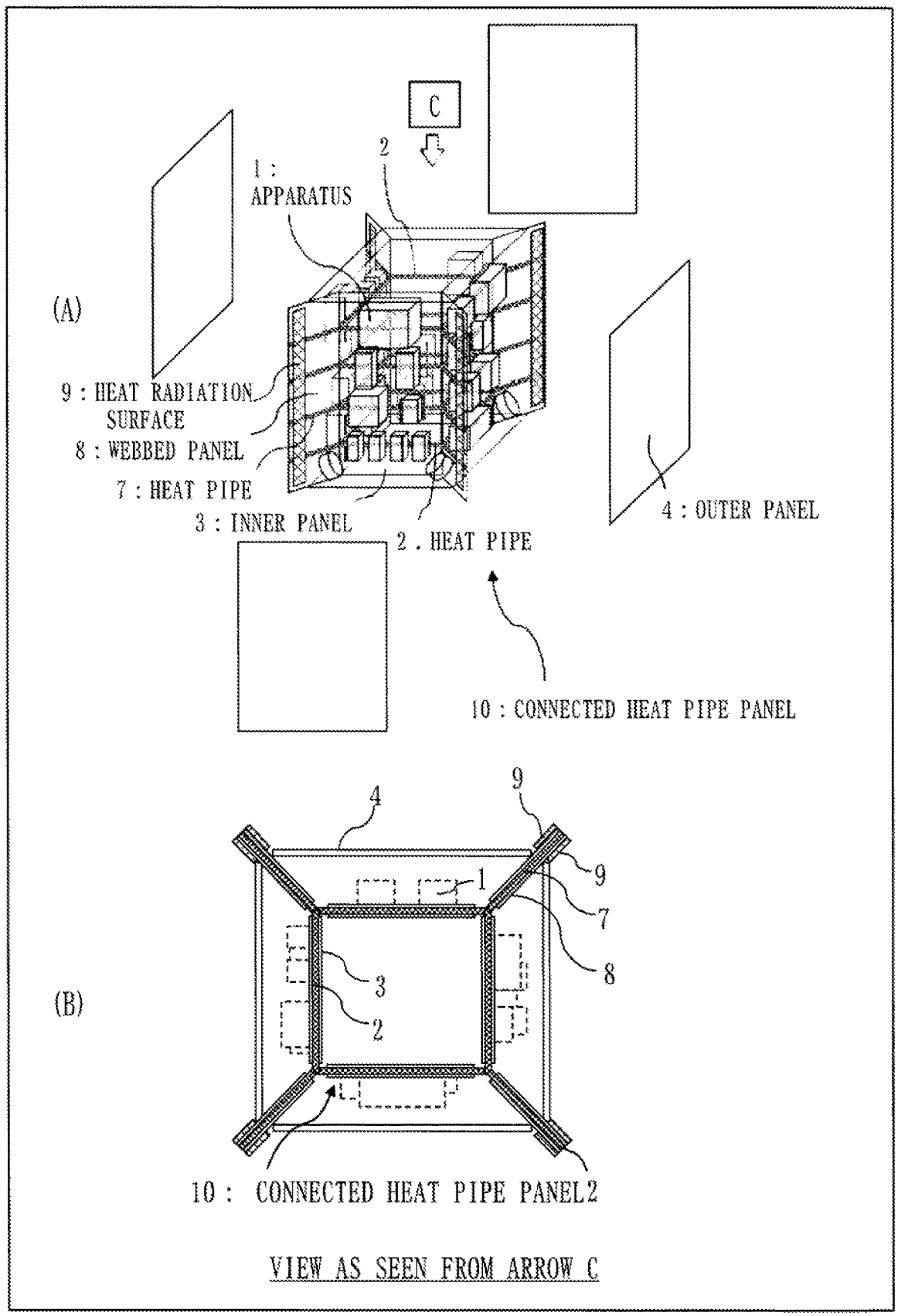
FIG. 3 is a structure view of a heat radiator including a connected heat pipe panel 10 according to Embodiment 2. (A) of FIG. 3 is a perspective view illustrating a state where the outer panels 4 are removed from the heat radiator and is the perspective view drawn so that internal components are seen. (B) of FIG. 3 is a view of the heat radiator as seen in a direction of an arrow C in (A) of FIG. 3.

FIG. 3 is a structure view of a heat radiator including a connected heat pipe panel 10 according to Embodiment 2. In FIG. 3, 7 denotes heat pipes, 8 denotes webbed panels and 9 denotes heat radiation surfaces.

Figure 4:
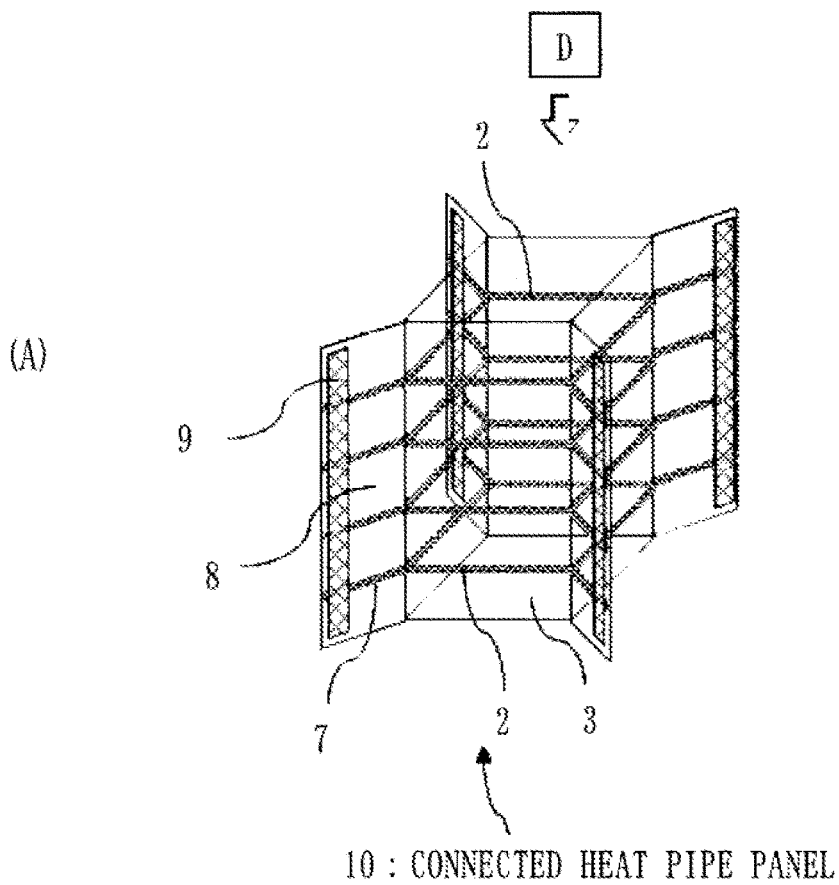
FIG. 4 is a structure view of the connected heat pipe panel 10 according to Embodiment 2. (A) of FIG. 4 is a perspective view of the connected heat pipe panel 10. (B) of FIG. 4 is a view of the connected heat pipe panel 10 as seen in a direction of an arrow D in (A) of FIG. 4.
Figure 4:
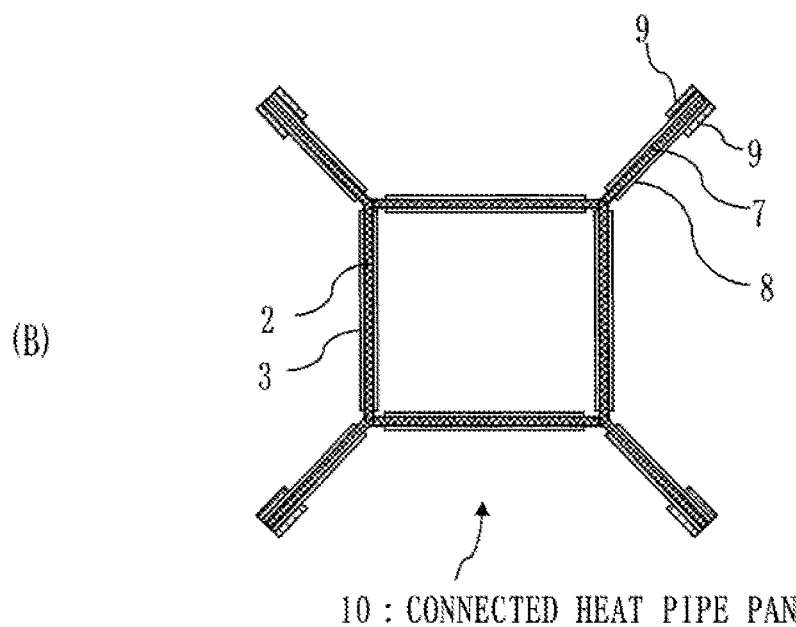

FIG. 4 is a structure view of the connected heat pipe panel 10 according to Embodiment 2, in which only the connected heat pipe panel 10 is illustrated from the drawing in FIG. 3.

The connected heat pipe panel 10 according to Embodiment 2 includes the webbed panels 8 that are radially arranged at corners of the connected heat pipe panel 6 in Embodiment 1 and are extended in an outer direction from the inner panels 3. The connected heat pipe panel 10 has a structure in which the webbed panels 8 and the heat pipes 7 horizontally arranged and built in the webbed panels 8 are thermally connected to the inner panels 3 and the heat pipes 2 built in the inner panels 3.

Next, the operation will be explained with reference to FIG. 3 and FIG. 4.

Heat generated in the plural apparatuses 1 attached to the inner panels 3 is diffused in a circumferential direction of the inner panels 3 through the heat pipes 2 and is transmitted to the heat pipes 7 of the webbed panels 8, then, the heat is radiated from the heat radiation surfaces 9 provided in the webbed panels 8 to the space.

A heat generation apparatus may be mounted on the webbed panel 8 in which the heat pipe 7 is built.

The number of webbed panels 8 in which the heat pipes 7 are built is not specified and one to four webbed panels 8 may be provided. The shape, size and layout of the heat radiation surfaces 9 on the webbed panels 8 are not specified as long as the heat radiation surfaces 9 envelop areas in which the heat pipes 7 are built and the areas are exposed to the space. Moreover, the shape and size of the webbed panels 8 in which the heat pipes 7 horizontally arranged and connected to the heat pipes 2 are built and which have areas in which the heat radiation surfaces 9 can be arranged and which can be exposed to the space are not specified. Furthermore, the layout of the heat pipes 2 and the heat pipes 7 horizontally arranged and respectively built in the inner panels 3 and the webbed panels 8 are not specified as long as the heat pipes 2 and the heat pipes 7 have positional relationship in which they can be connected to one another, and the number of these pipes is not specified either.

As described above, the connected heat pipe panel 10 including the inner panels 3 and the webbed panels 8 according to Embodiment 2 is characterized in that the heat pipes 2 horizontally arranged and built in the inner panels 3 and the heat pipes 7 built in the webbed panels 8 are thermally connected at plural places in the circumferential direction and that the heat pipes 7 connected to the heat pipes 2 are extended to the heat radiation surfaces 9 on the webbed panels 8.

According to the above structure, the same thermal structure design and equipment layout design having higher heat radiation ability than that of Embodiment 1 can be applied even when apparatuses to be mounted or conditions of the orbit and attitude at the time of putting the satellite differ, thereby standardizing mechanical system design and reducing the development period and costs.

Embodiment 3

In Embodiment 3, a heat radiator having a hexahedral fuselage shape in which webbed panels and outer panels in which heat pipes are built are added with respect to Embodiment 1 and a connected heat pipe includes inner panels, webbed panels, outer panels and heat radiation surfaces provided on the outer panels will be explained. The embodiment differs from the webbed panel of Embodiment 2 in that the heat radiation surfaces are not provided on the webbed panels in which the heat pipes are built.

Hereinafter, items different from those in Embodiments 1 and 2 will be chiefly explained. Items explanation of which is omitted are the same as those in Embodiments 1 and 2.

Figure 5:
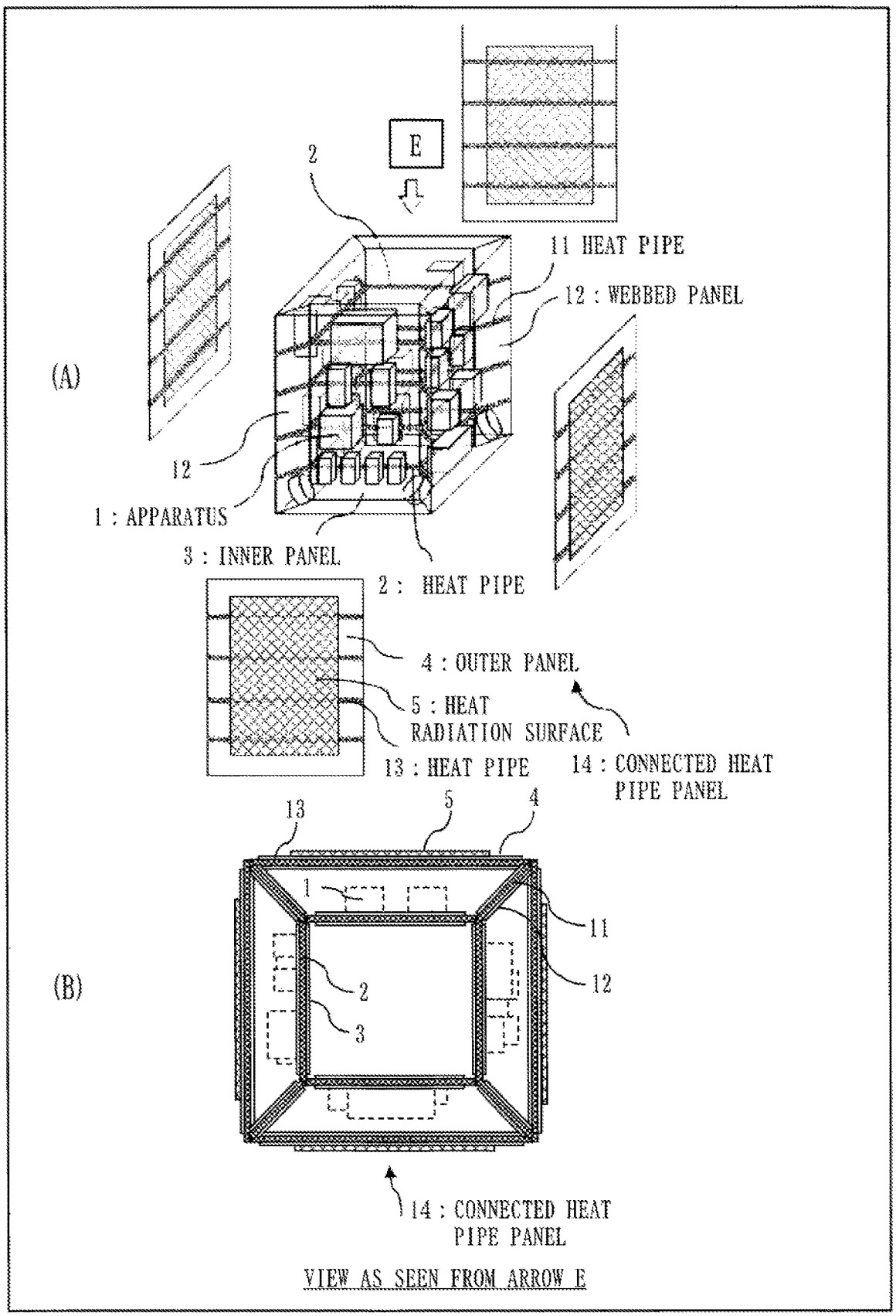
FIG. 5 is a structure view of a heat radiator including a connected heat pipe panel 14 according to Embodiment 3. (A) of FIG. 5 is a perspective view illustrating a state where the outer panels 4 are removed from the heat radiator and is the perspective view drawn so that internal components are seen. (B) of FIG. 5 is a view of the heat radiator as seen in a direction of an arrow E in (A) of FIG. 5.

FIG. 5 is a structure view of a heat radiator including a connected heat pipe panel 14 according to Embodiment 3. In FIG. 5, 12 denotes webbed panels, 11 denotes heat pipes provided in the webbed panels 12 and 13 denotes heat pipes provided in the outer panels 4.

Figure 6:
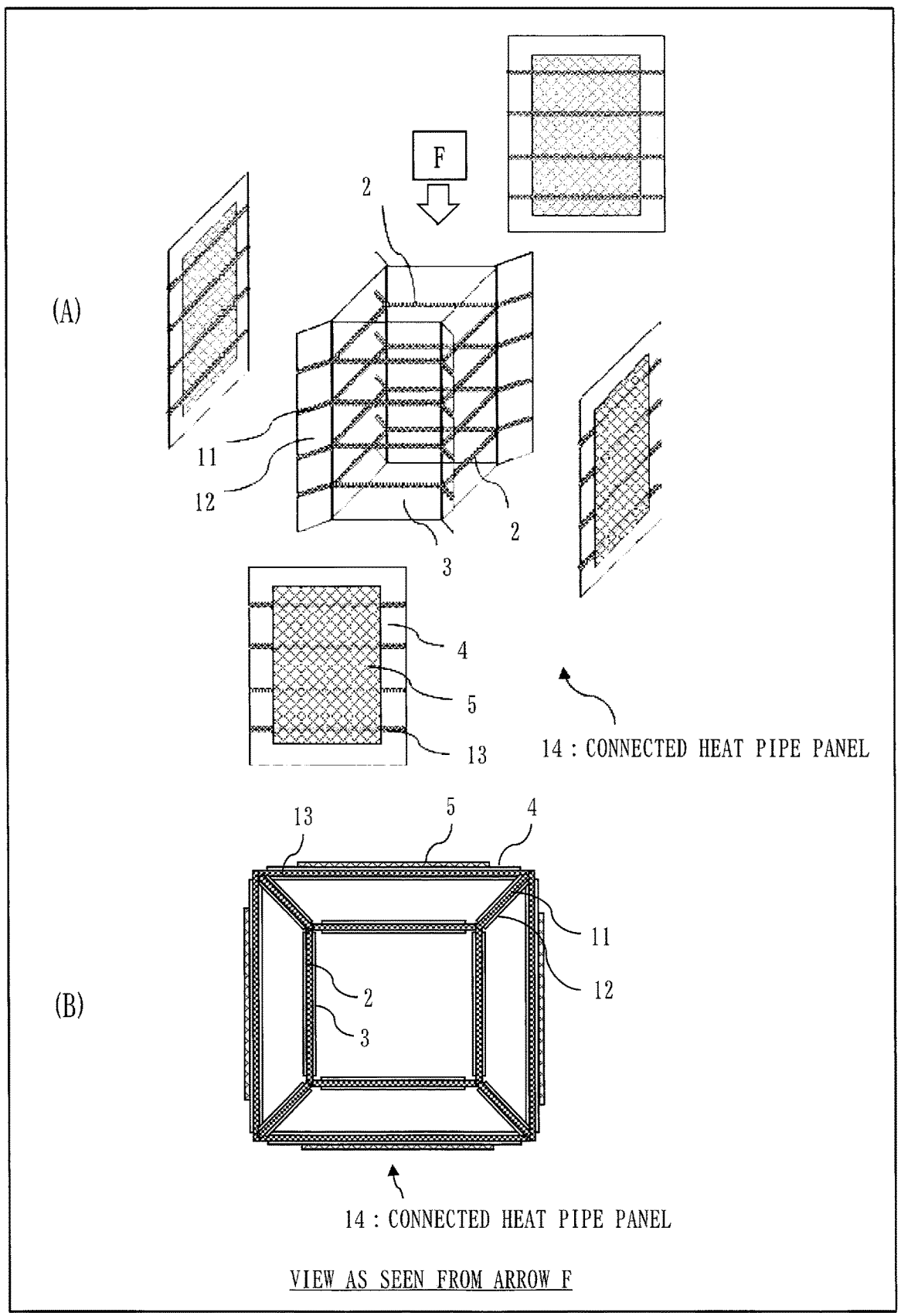
FIG. 6 is a structure view of the connected heat pipe panel 14 according to Embodiment 3. (A) of FIG. 6 is a perspective view of the connected heat pipe panel 14. (B) of FIG. 6 is a view of the connected heat pipe panel 14 as seen in a direction of an arrow F in (A) of FIG. 6.

FIG. 6 is a structure view of the connected heat pipe panel 14 according to Embodiment 3, in which only the connected heat pipe panel 14 is illustrated from the drawing in FIG. 5.

The connected heat pipe panel 14 according to Embodiment 3 has a structure in which the webbed panels 12 radially arranged at corners of the connected heat pipe panel 10 according to Embodiment 1 and the heat pipes 11 horizontally arranged and built in the webbed panels 12 are thermally connected to the inner panels 3 and the heat pipes 2 built in the inner panels 3 as well as thermally connected to the outer panels 4 having the heat radiation surfaces 5 and the heat pipes 13 horizontally arranged and built in the outer panels 4.

Next, the operation will be explained with reference to FIG. 5 and FIG. 6.

Heat generated in plural apparatuses 1 attached to the inner panels 3 is transmitted to the outer panels 4 through the heat pipes 2, the heat pipes 11 and the heat pipes 13 and the heat is radiated from the heat radiation surfaces 5 of the outer panels 4 to the space.

Heat generation apparatuses may be mounted on the webbed panel 12 in which the heat pipes 11 built and the outer panel 4. The number of webbed panels 12 in which the heat pipes 11 are built and the outer panels 4 in which the heat pipes 13 are built is not specified and one to four webbed panels as well as one to four outer panels may be provided, respectively.

The shape and the size of the outer panels 4 in which the heat pipes 13 horizontally arranged and connected to the heat pipes 11 built in the webbed panels 12 are built are not limited to the illustrated shape and size.

The layout of the heat pipes 2, the heat pipes 11 and the heat pipes 13 horizontally arranged and built in the inner panels 3, the webbed panels 12 and the outer panels 4 respectively is not specified as long as these pipes have a positional relationship in which they can be connected to one another and the number of these pipes is not specified either.

As described above, the connected heat pipe panel 14 including the inner panels 3, the webbed panels 12 and the outer panels 4 according to Embodiment 3 is characterized in that the heat pipes 2 horizontally arranged and built in the inner panels 3 are thermally connected at plural places in the circumferential direction, the heat pipes 2 and the heat pipes 11 built in the webbed panels 12 are thermally connected, and the heat pipes 13 thermally connected to the heat pipes 11 and built in the outer panels 4 are extended to the heat radiation surfaces 5 of the outer panels 4.

According to the above structure, the same thermal structure design and equipment layout design having higher heat radiation ability than that of Embodiment 2 can be applied even when apparatuses to be mounted or conditions of the orbit and attitude at the time of putting the satellite differ, thereby standardizing mechanical system design and reducing the development period and costs.

Embodiment 4

In Embodiment 4, a heat radiator having a hexahedral fuselage shape in which the outer panels in which heat pipes according to Embodiment 3 is built are added with respect to Embodiment 2 and a connected heat pipe panel includes inner panels, webbed panels, outer panels and heat radiation surfaces provided on both the webbed panels and the outer panels will be explained.

Embodiment 4 differs from Embodiment 3 in that the heat radiation surfaces are provided in the webbed panels in which heat pipes are built.

Hereinafter, items different from those in Embodiments 1, 2 and 3 will be chiefly explained. Items explanation of which is omitted are the same as those in Embodiments 1, 2 and 3.

Figure 7:
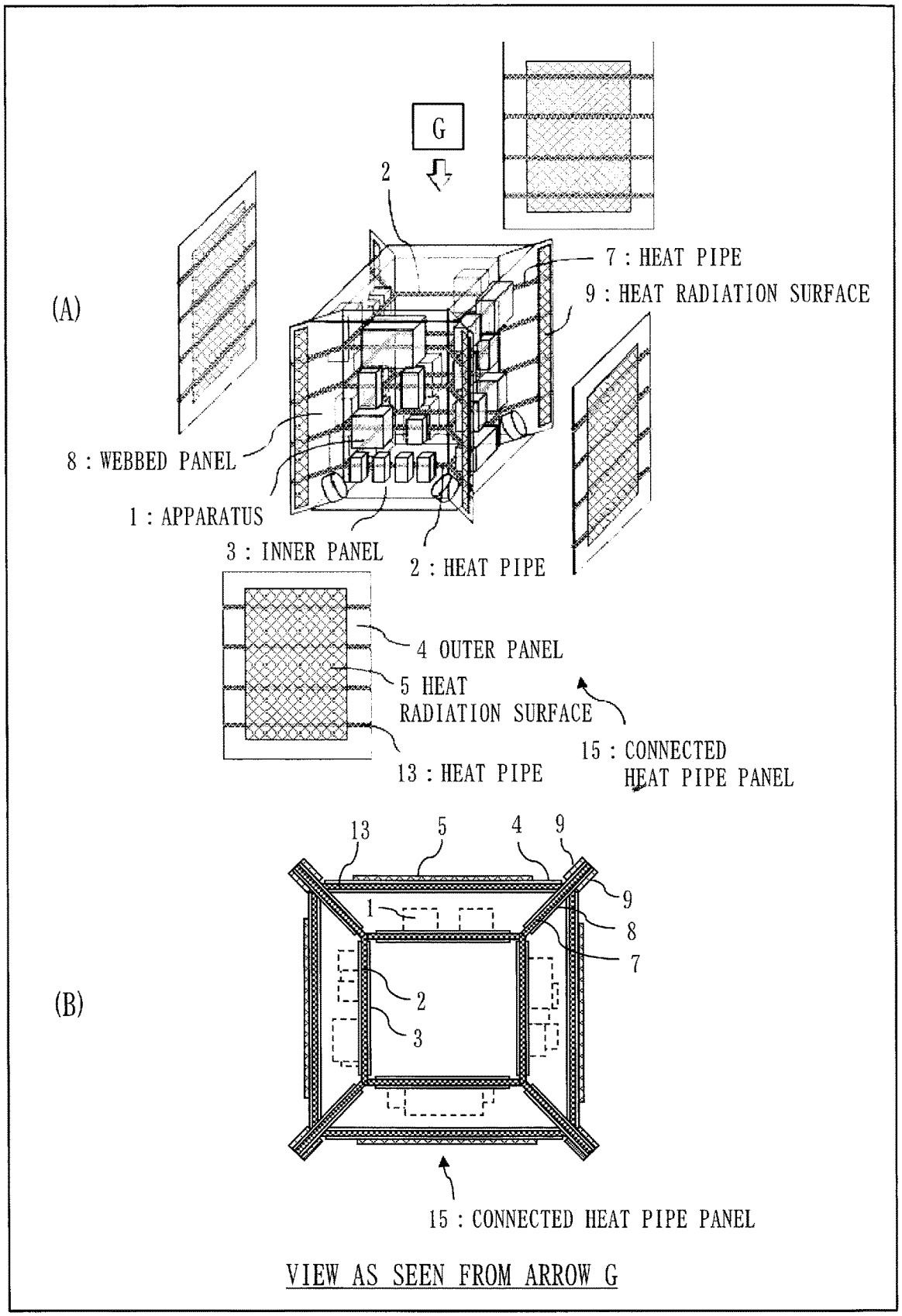
FIG. 7 is a structure view of a heat radiator including a connected heat pipe panel 15 according to Embodiment 4. (A) of FIG. 7 is a perspective view illustrating a state where the outer panels 4 are removed from the heat radiator and is the perspective view drawn so that internal components are seen. (B) of FIG. 7 is a view of the heat radiator as seen in a direction of an arrow G in (A) of FIG. 7.

FIG. 7 is a structure view of a heat radiator including a connected heat pipe panel 15 according to Embodiment 4.

Figure 8:
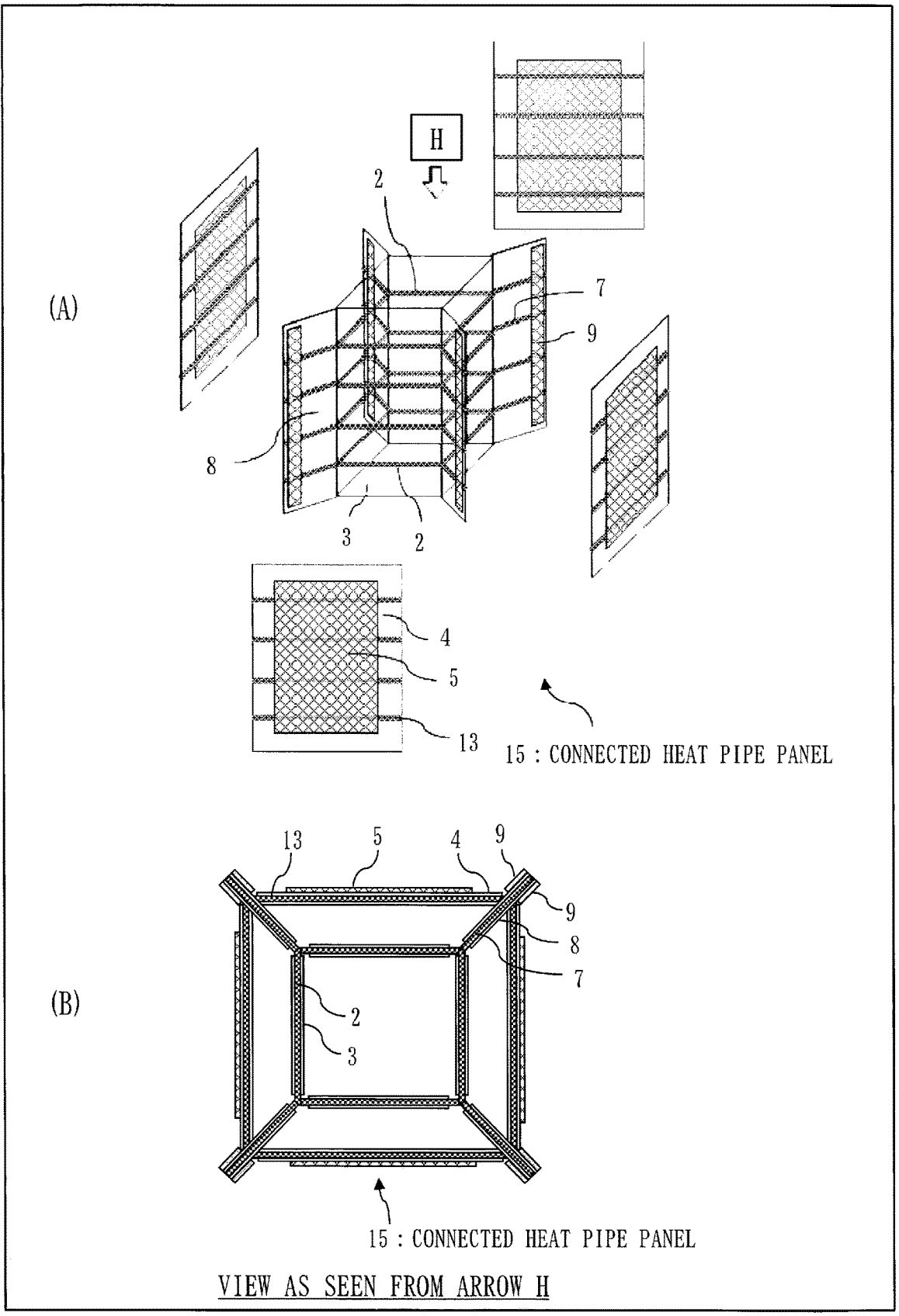
FIG. 8 is a structure view of the connected heat pipe panel 15 according to Embodiment 4. (A) of FIG. 8 is a perspective view of the connected heat pipe panel 15. (B) of FIG. 8 is a view of the connected heat pipe panel 15 as seen in a direction of an arrow H in (A) of FIG. 8.

FIG. 8 is a structure view of the connected heat pipe panel 15 according to Embodiment 4, in which only the connected heat pipe panel 15 is illustrated from the drawing in FIG. 7.

The connected heat pipe panel 15 according to Embodiment 4 has a structure in which the webbed panels 8 having the heat radiation surfaces 9 radially arranged at corners of the connected heat pipe panel 10 according to Embodiment 1 and the heat pipes 7 built in the webbed panels 8 are thermally connected to the inner panels 3 and the heat pipes 2 built in the inner panels 3 as well as thermally connected also to the outer panels 4 having the heat radiation surfaces 5 and the heat pipes 13 built in the outer panels 4.

Next, the operation will be explained with reference to FIG. 7 and FIG. 8.

Heat generated in plural apparatuses 1 attached to the inner panels 3 is transmitted to the webbed panels 8 and the outer panels 4 through the heat pipes 2, the heat pipes 7 and the heat pipes 13 and the heat is radiated from the heat radiation surfaces 9 of the webbed panels 8 and the heat radiation surfaces 5 of the outer panels 4 to the space.

As described above, the connected heat pipe panel 15 including the inner panels 3, the webbed panels 8 and the outer panels 4 according to Embodiment 4 is characterized in that the heat pipes 2 horizontally arranged and built in the inner panels 3 are thermally connected at plural places in the circumferential direction, the heat pipes 7 thermally connected to the heat pipes 2 and built in the webbed panels 8 are extended to the heat radiation surfaces 9 of the webbed panels 8, and the heat pipes 13 thermally connected to the heat pipes 7 and built in the outer panels 4 are extended to the heat radiation surfaces 5 of the outer panels 4. Other components are the same as those of Embodiments 2 and 3.

According to the above structure, the heat radiation surfaces are provided on both the webbed panels 8 and the outer panels 4 in which the heat pipes are built, therefore, the connected heat pipe has a higher heat radiation ability than the connected heat pipe panel 14 according to Embodiment 3.

Figure 17:
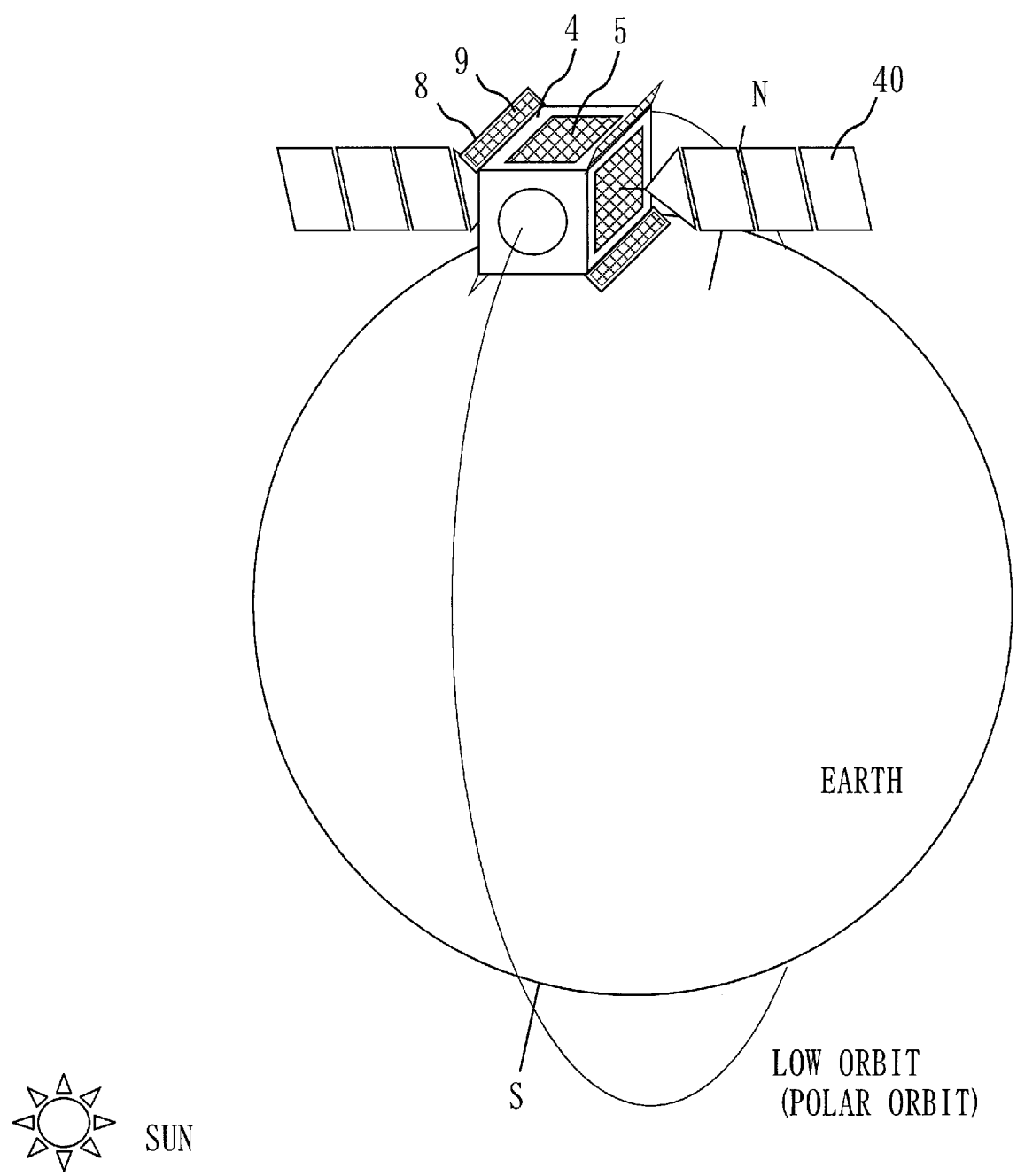
FIG. 17 is a conceptual diagram of a low orbit satellite on an orbit according to Embodiment 4.
Figure 18:
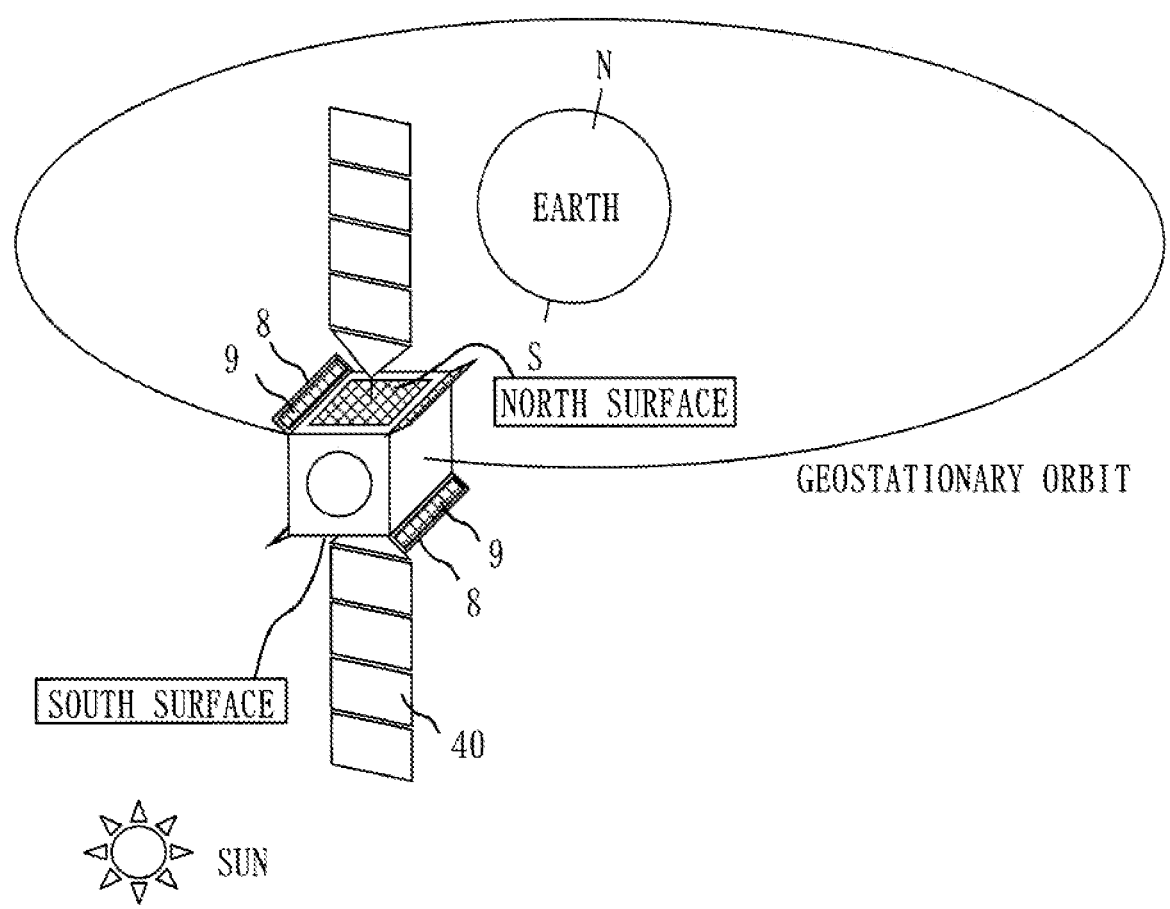
FIG. 18 is a conceptual diagram of a geostationary satellite on an orbit according to Embodiment 4.

The same thermal structure design and equipment layout design can be applied even when a satellite on which the connected heat pipe panel 15 according to the present embodiment is mounted is a low orbit satellite (see FIG. 17) or a geostationary satellite (FIG. 18), thereby obtaining advantages that mechanical system design can be standardized and the development period and costs can be reduced.

Embodiment 5

A heat radiator according to Embodiment 5 is a heat radiator configured by a connected heat pipe panel in which inner panels to which apparatuses are installed has six surfaces in a tubular shape, and an example in which the hexahedral fuselage shape in Embodiment 1 is changed into an octahedron will be explained.

Figure 22:
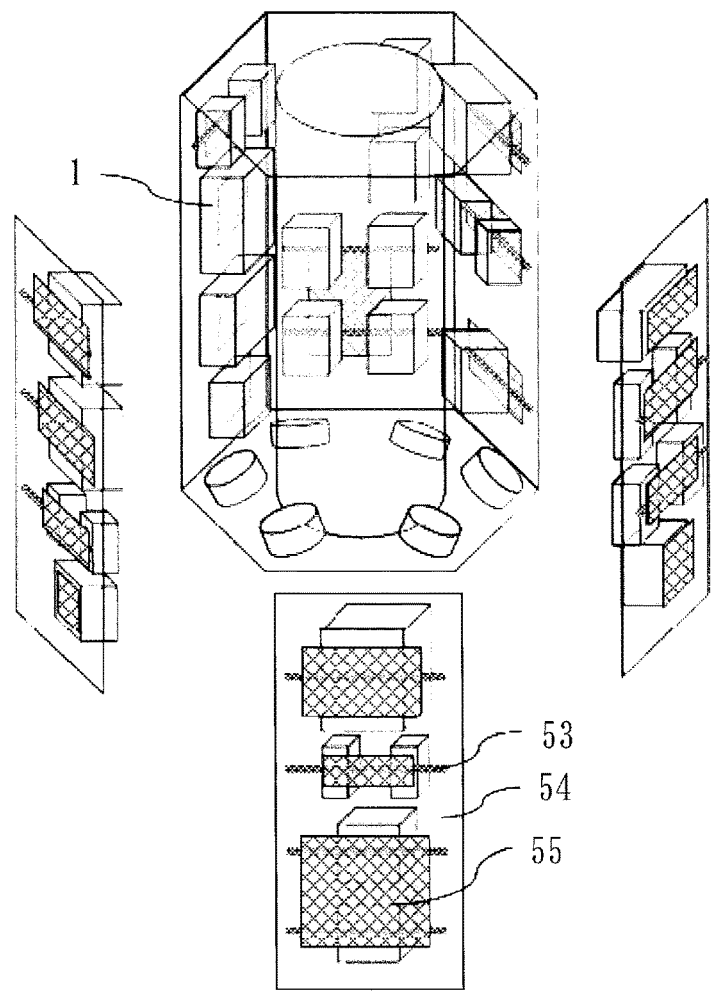
FIG. 22 is a view illustrating a related-art heat radiator of an artificial satellite having an octahedral shape.
Figure 23:
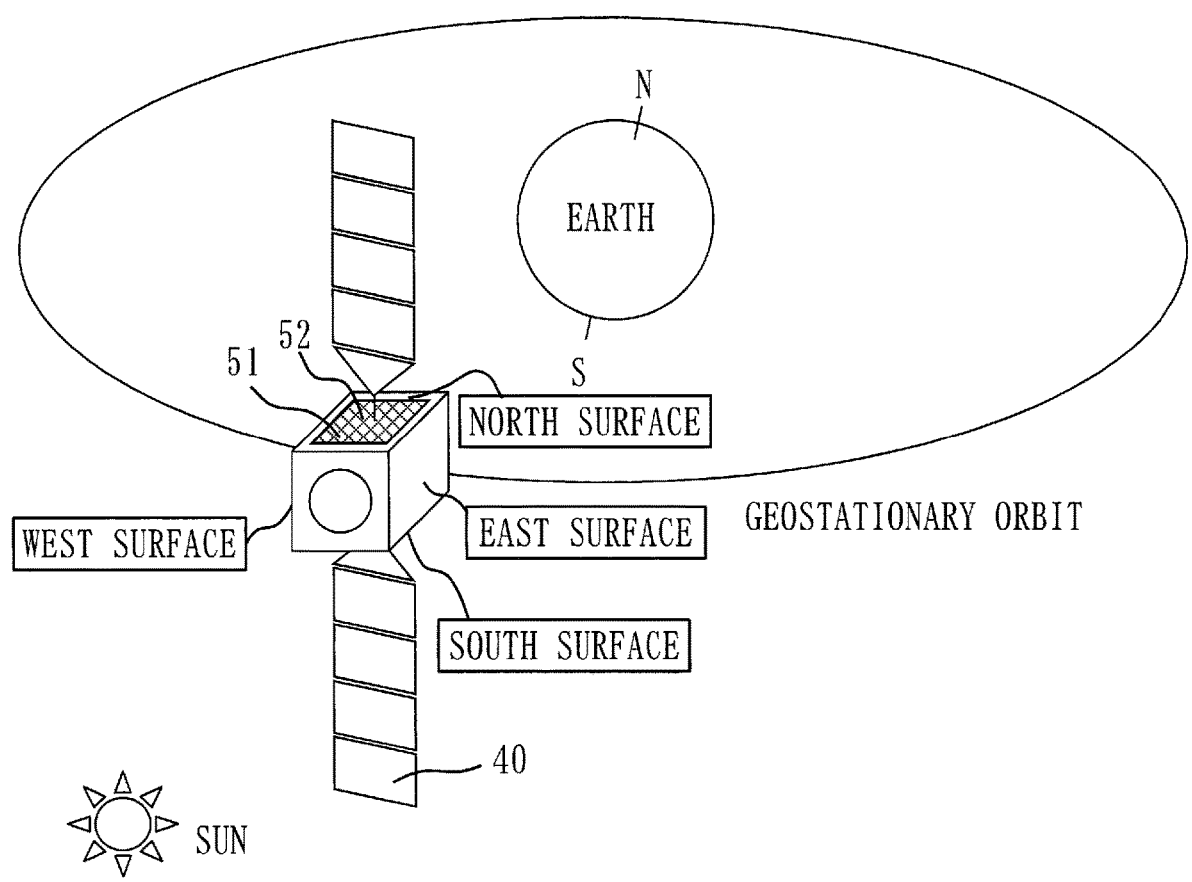
FIG. 23 is a conceptual diagram of a related-art geostationary satellite on an orbit.

FIG. 22 is a view illustrating a related-art heat radiator of an artificial satellite having an octahedral shape, in which generated heat of apparatuses mounted on the inside of the satellite is radiated to the space through heat radiation surfaces 55 by using structure panels 54 in which heat pipes 53 are built in respective structure panels.

Hereinafter, items different from those of Embodiment 1 will be chiefly explained. Items explanation of which is omitted are the same as those in Embodiment 1.

Figure 9:
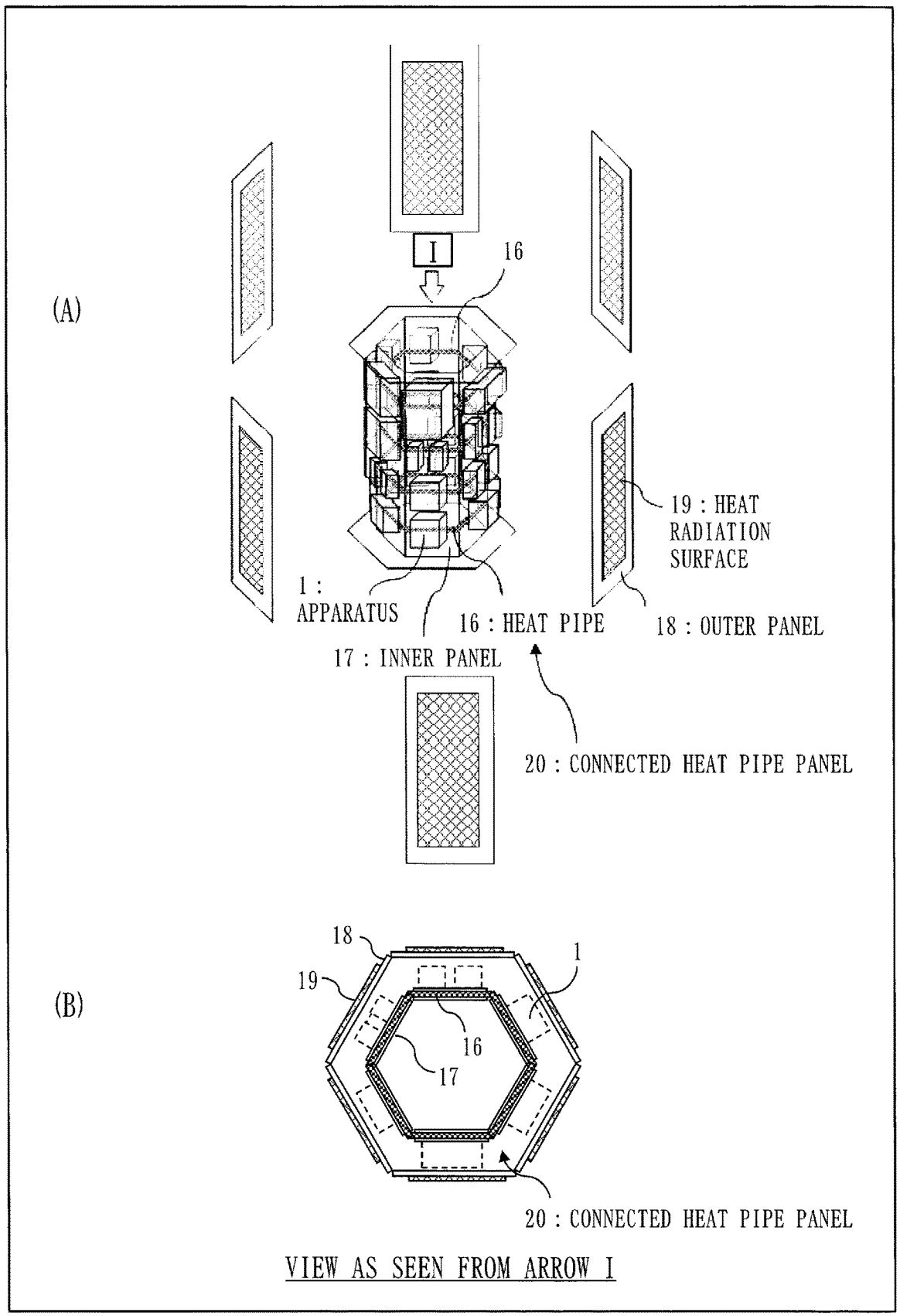
FIG. 9 is a structure view of a heat radiator including a connected heat pipe panel 20 according to Embodiment 5. (A) of FIG. 9 is a perspective view illustrating a state where outer panels 18 are removed from the heat radiator and is the perspective view drawn so that internal components are seen. (B) of FIG. 9 is a view of the heat radiator as seen in a direction of an arrow I in (A) of FIG. 9.

FIG. 9 is a structure view including a connected heat pipe panel 20 according to Embodiment 5. In FIG. 9, 16 denotes heat pipes provided in inner panels 17, 17 denotes the inner panels on which the apparatuses 1 are mounted, 18 denotes octahedral outer panels and 19 denotes heat radiation surfaces provided in the outer panels 18.

Figure 10:
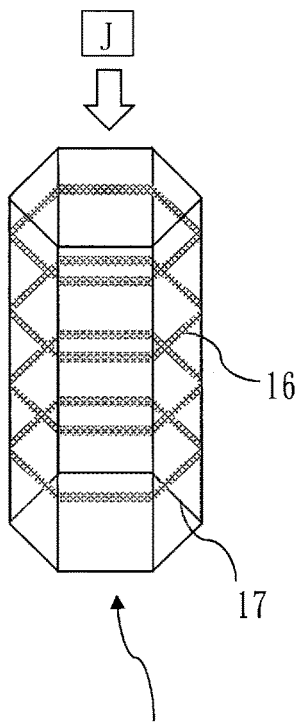
FIG. 10 is a structure view of the connected heat pipe panel 20 according to Embodiment 5. (A) of FIG. 10 is a perspective view of the connected heat pipe panel 20. (B) of FIG. 10 is a view of the connected heat pipe panel 20 as seen in a direction of an arrow J in (A) of FIG. 10.
Figure 10:
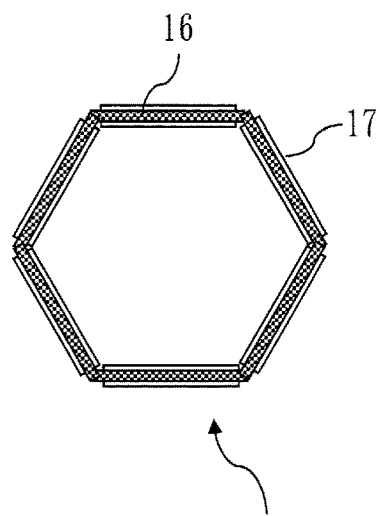

FIG. 10 is a structure view of the connected heat pipe panel 20 according to Embodiment 5, in which only the connected heat pipe panel 20 is illustrated from the drawing in FIG. 9.

The connected heat pipe panel 20 according to Embodiment 5 has a tubular shape in which the inner panels 17 with six surfaces and the heat pipes 16 horizontally embedded in the inner panels 17 are thermally connected in the circumferential direction.

The operation of the connected heat pipe panel 20 according to Embodiment 5 is the same as that of Embodiment 1 except that the number of surfaces of the inner panels 17 is six and that the fuselage shape is an octahedron.

As described above, according to the present embodiment, the same thermal structure design and equipment layout design can be applied even when the fuselage shape is the octahedron and apparatuses to be mounted or conditions of the orbit and attitude at the time of putting the satellite differ, thereby standardizing mechanical system design and reducing the development period and costs.

Embodiment 6

A heat radiator according to Embodiment 6 is a heat radiator in which the webbed panels in which heat pipes are built are added with respect to Embodiment 5 and a connected heat pipe panel includes inner panels, webbed panels and heat radiation surfaces provided on the webbed panels. In Embodiment 6, an example in which the hexahedral fuselage shape in Embodiment 2 is changed into an octahedron will be explained.

Hereinafter, items different from those in Embodiment 2 and Embodiment 5 will be chiefly explained. Items explanation of which is omitted are the same as those in Embodiments 2 and 5.

Figure 11:
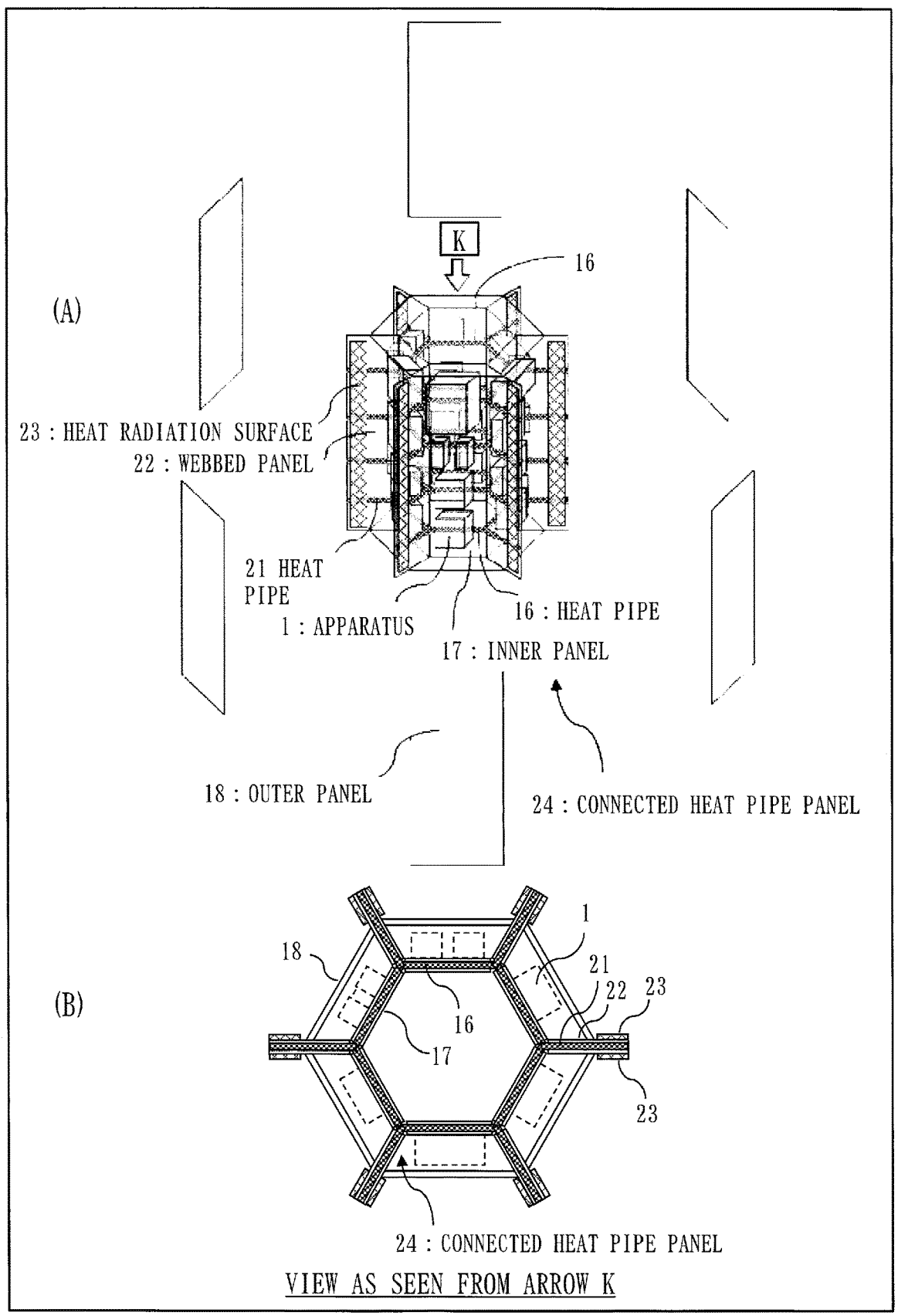
FIG. 11 is a structure view of a heat radiator including a connected heat pipe panel 24 according to Embodiment 6. (A) of FIG. 11 is a perspective view illustrating a state where the outer panels 18 are removed from the heat radiator and is the perspective view drawn so that internal components are seen. (B) of FIG. 11 is a view of the heat radiator as seen in a direction of an arrow K in (A) of FIG. 11.

FIG. 11 is a structure view of a heat radiator including a connected heat pipe panel 24 according to Embodiment 6. In FIG. 11, 22 denotes webbed panels, 21 denotes heat pipes provided in the webbed panels 22 and 23 denotes heat radiation surfaces provided on the webbed panels 22.

Figure 12:
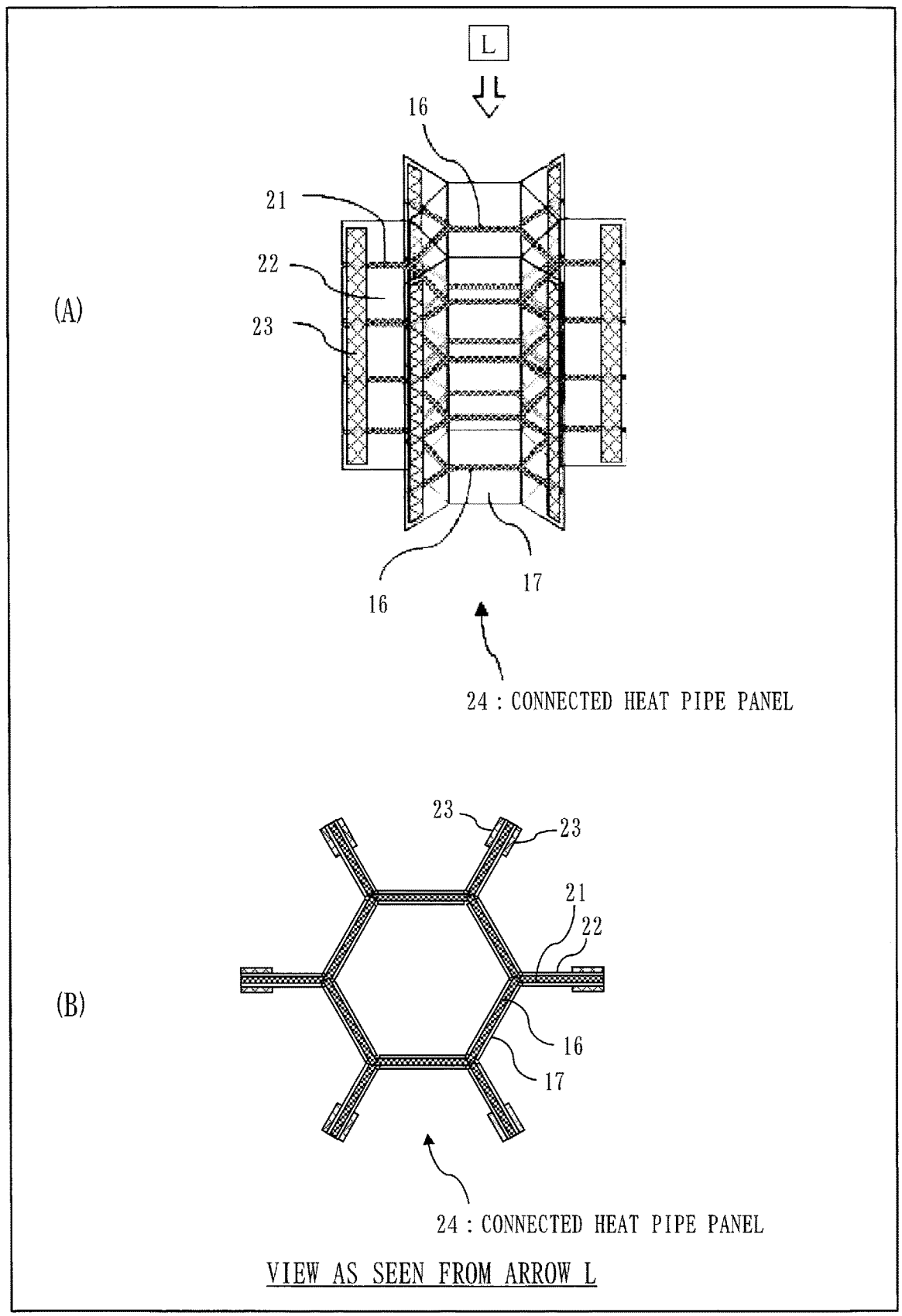
FIG. 12 is a structure view of the connected heat pipe panel 24 according to Embodiment 6. (A) of FIG. 12 is a perspective view of the connected heat pipe panel 24. (B) of FIG. 12 is a view of the connected heat pipe panel 24 as seen in a direction of an arrow L in (A) of FIG. 12.

FIG. 12 is a structure view of the connected heat pipe panel 24 according to Embodiment 6, in which only the connected heat pipe panel 24 is illustrated from the drawing in FIG. 11.

The connected heat pipe panel 24 according to Embodiment 6 has a structure in which the webbed panels 22 radially arranged at corners of the connected heat pipe panel 20 according to Embodiment 5 and the heat pipes 21 horizontally arranged and built in the webbed panel 22 are thermally connected to inner panels 17 and the heat pipes 16 built in the inner panels 17.

The number of webbed panels 22 in which the heat pipes 21 are built is not specified and one to six webbed panels 22 may be provided. The connected heat pipe panel 24 according to Embodiment 6 is the same as that of Embodiment 2 except that the number of surfaces of the inner panels 17 is six and that the fuselage shape is an octahedron.

As described above, according to the present embodiment, the same thermal structure design and equipment layout design having higher heat radiation ability than that of Embodiment 5 can be applied even when the fuselage shape is the octahedron and apparatuses to be mounted or conditions of the orbit and attitude at the time of putting the satellite differ, thereby standardizing mechanical system design and reducing the development period and costs.

Embodiment 7

A heat radiator according to Embodiment 7 is a heat radiator in which the webbed panels and outer panels in which heat pipes are built are added with respect to Embodiment 5 and a connected heat pipe includes inner panels, webbed panels, outer panels and heat radiation surfaces provided on the outer panels.

Here, an example in which the hexahedral fuselage shape according to Embodiment 3 is changed into an octahedron will be explained.

The webbed panels according to the embodiment differs from those of Embodiment 6 in that heat radiation surfaces do not exist on the webbed panels in which the heat pipes are built.

Hereinafter, items different from those in Embodiments 3, 5 and 6 will be chiefly explained. Items explanation of which is omitted are the same as those in Embodiments 3, 5 and 6.

Figure 13:
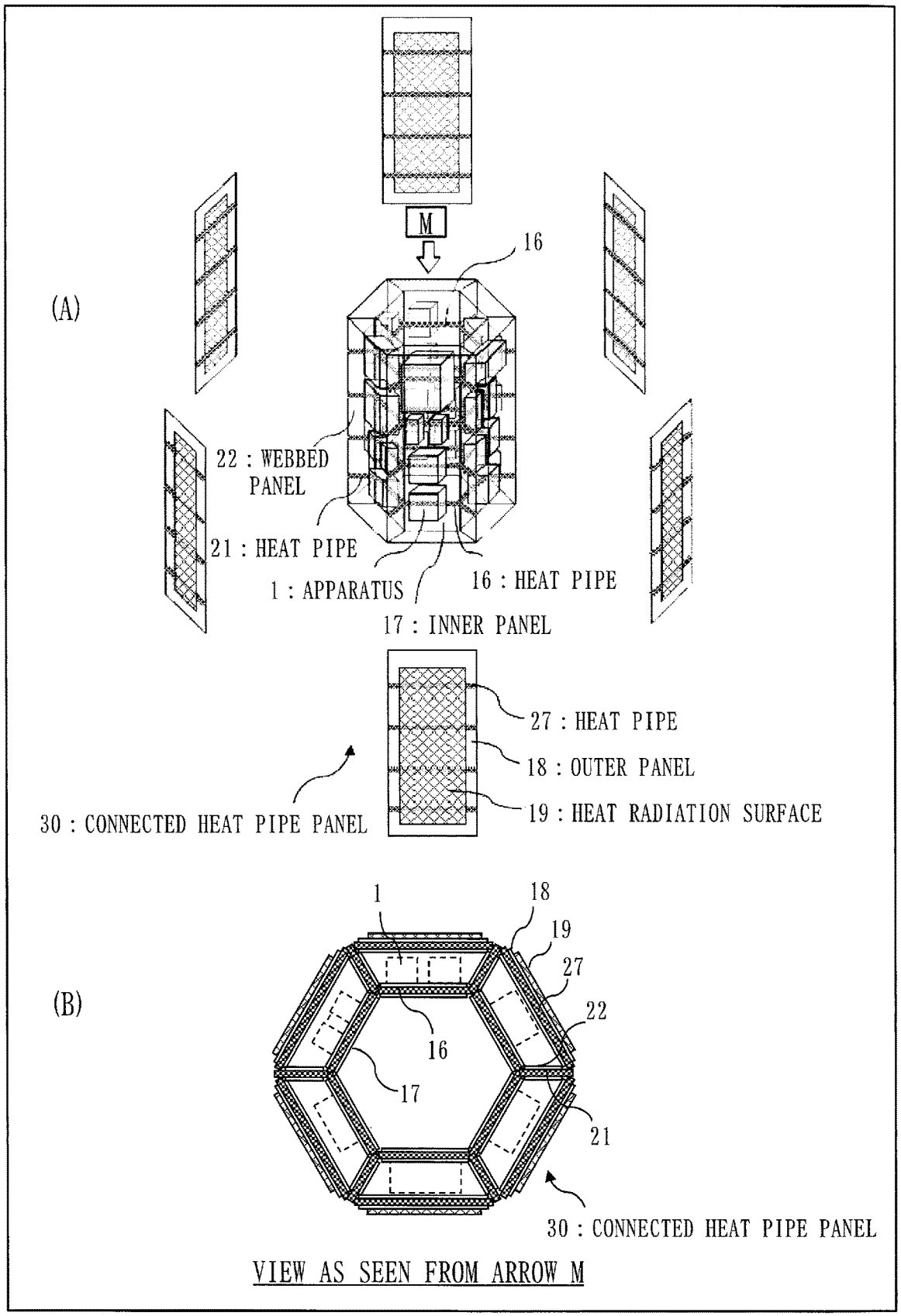
FIG. 13 is a structure view of a heat radiator including a connected heat pipe panel 30 according to Embodiment 7. (A) of FIG. 13 is a perspective view illustrating a state where the outer panels 18 are removed from the heat radiator and is the perspective view drawn so that internal components are seen. (B) of FIG. 13 is a view of the heat radiator as seen in a direction of an arrow M in (A) of FIG. 13.

FIG. 13 is a structure view of a heat radiator including a connected heat pipe panel 30 according to Embodiment 7. In FIG. 13, 22 denotes webbed panel, 21 denotes heat pipes provided in the webbed panel 22 and 27 denotes heat pipes provided on the outer panels 18.

Figure 14:
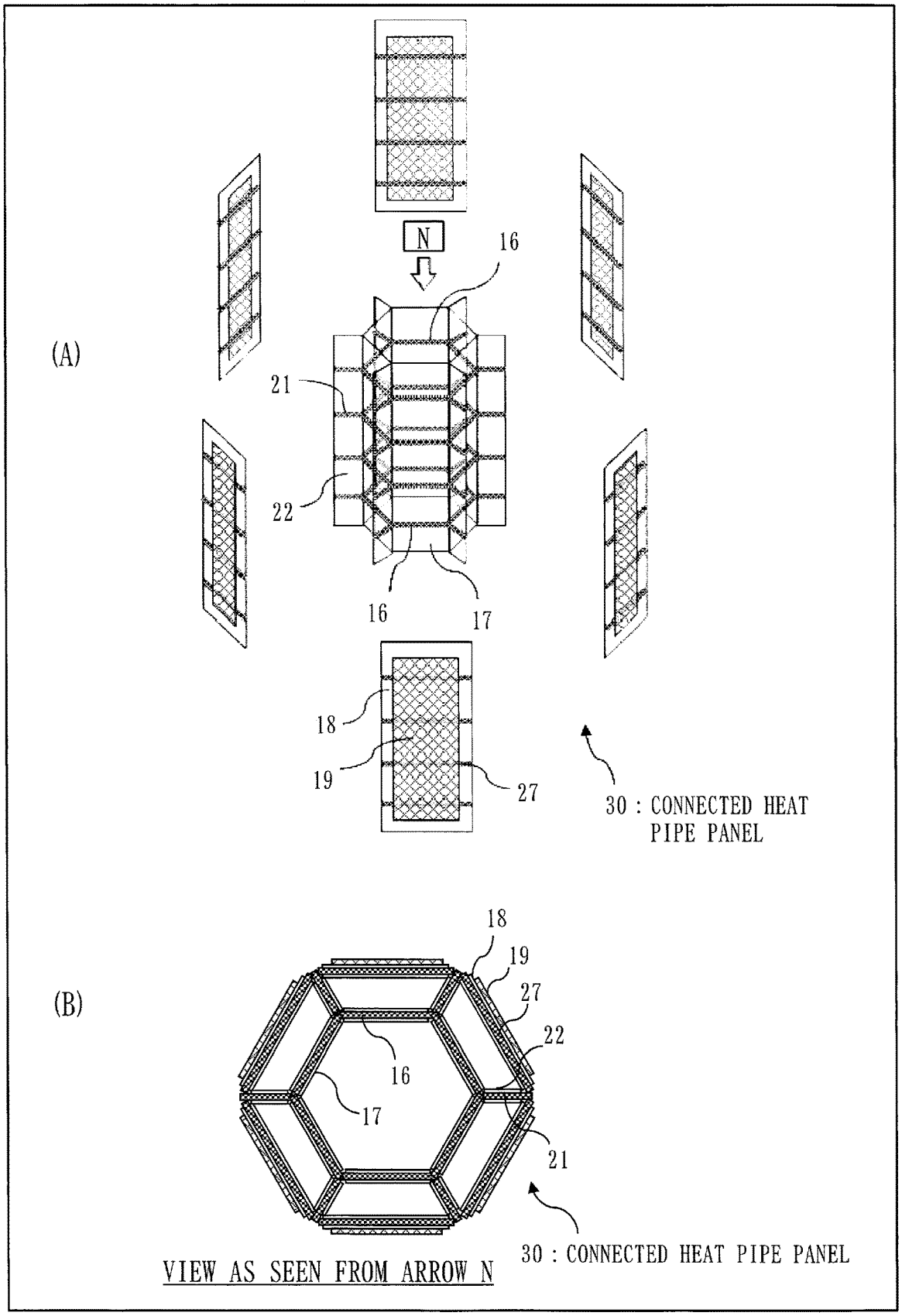
FIG. 14 is a structure view of the connected heat pipe panel 30 according to Embodiment 7. (A) of FIG. 14 is a perspective view of the connected heat pipe panel 30. (B) of FIG. 14 is a view of the connected heat pipe panel 30 as seen in a direction of an arrow N in (A) of FIG. 14.

FIG. 14 is a structure view of the connected heat pipe panel 30 according to Embodiment 7, in which only the connected heat pipe panel 30 is illustrated from the drawing in FIG. 13.

The connected heat pipe panel 30 according to Embodiment 7 has a structure in which the webbed panels 22 radially arranged at corners of the connected heat pipe panel 20 according to Embodiment 5 and the heat pipes 21 horizontally arranged and built in the webbed panel 22 are thermally connected to inner panels 17 and heat pipes 16 built in the inner panels 17 as well as thermally connected also to the outer panels 18 having the heat radiation surfaces 19 and the heat pipes 27 horizontally arranged and built in the outer panel 18.

The numbers of webbed panels 22 in which the heat pipes 21 are built and the outer panels 18 in which the heat pipes 27 are built are not specified, and one to six panels may be provided, respectively.

The connected heat pipe panel 30 according to Embodiment 7 is the same as that of Embodiment 3 except that the number of surfaces of the inner panels 17 is six and that the fuselage shape is an octahedron.

As described above, according the present embodiment, the same thermal structure design and equipment layout design having higher heat radiation ability than that of Embodiment 6 can be applied even when the fuselage shape is the octahedron and apparatuses to be mounted or conditions of the orbit and attitude at the time of putting the satellite differ, thereby standardizing mechanical system design and reducing the development period and costs.

Embodiment 8

A heat radiation structure according to Embodiment 8 is a heat radiator in which the outer panels in which heat pipes according to Embodiment 7 are built are added with respect to Embodiment 6 and a connected heat pipe panel includes inner panels, webbed panels, outer panels and heat radiation surfaces provided on both the webbed panels and the outer panels.

Here, an example in which the hexahedral fuselage shape according to Embodiment 4 is changed into an octahedron will be explained.

The embodiment differs from Embodiment 7 in that there are heat radiation surfaces on the webbed panels in which the heat pipes are built. Hereinafter, items different from those in Embodiments 4, 6 and 7 will be chiefly explained. Items explanation of which is omitted are the same as those in Embodiment 4, Embodiment 6 and Embodiment 7.

Figure 15:
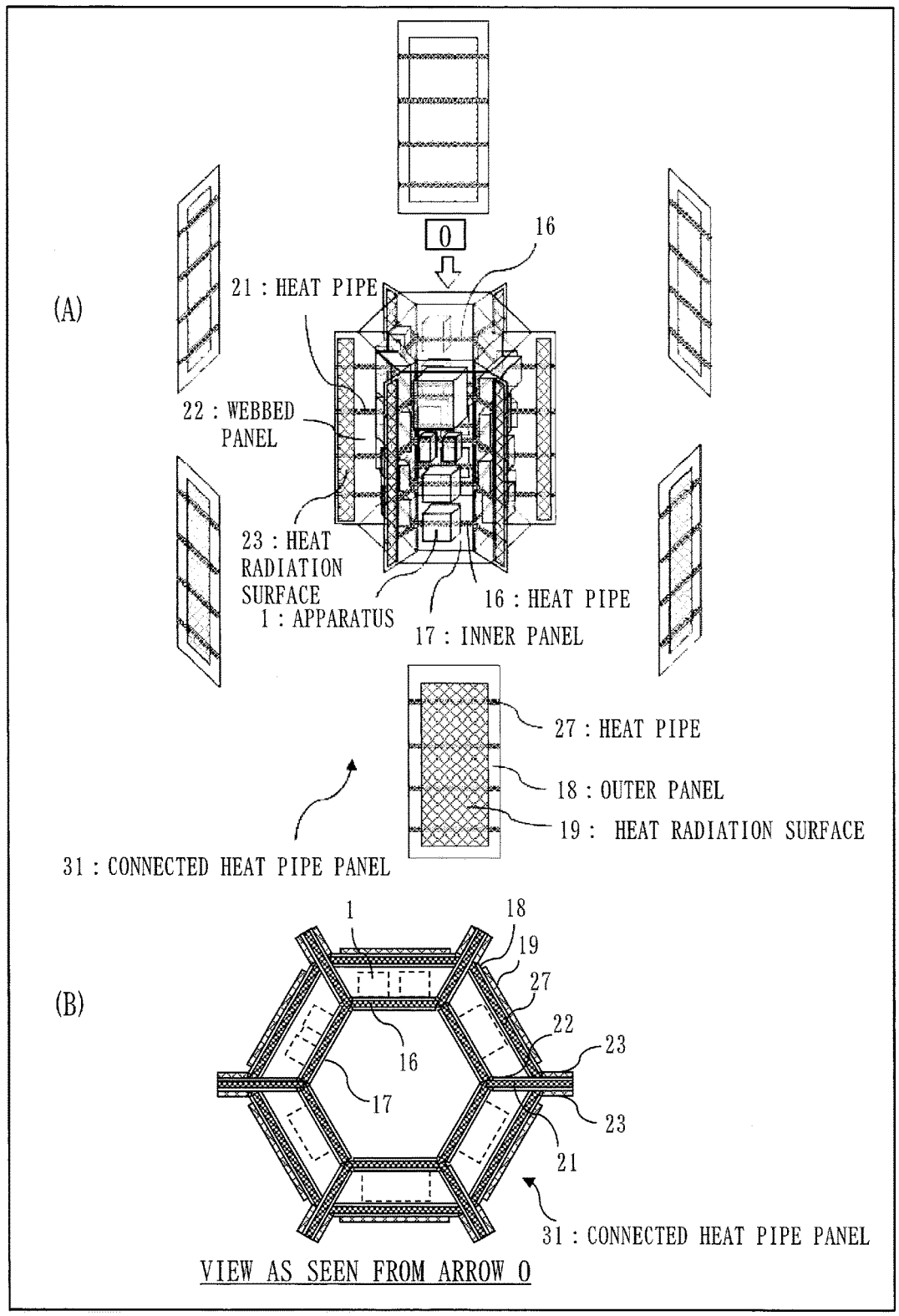
FIG. 15 is a structure view of a heat radiator including a connected heat pipe panel 31 according to Embodiment 8. (A) of FIG. 15 is a perspective view illustrating a state where the outer panels 18 are removed from the heat radiator and is the perspective view drawn so that internal components are seen. (B) of FIG. 15 is a view of the heat radiator as seen in a direction of an arrow O in (A) of FIG. 15.

FIG. 15 is a structure view of a heat radiator including a connected heat pipe panel 31 according to Embodiment 8.

Figure 16:
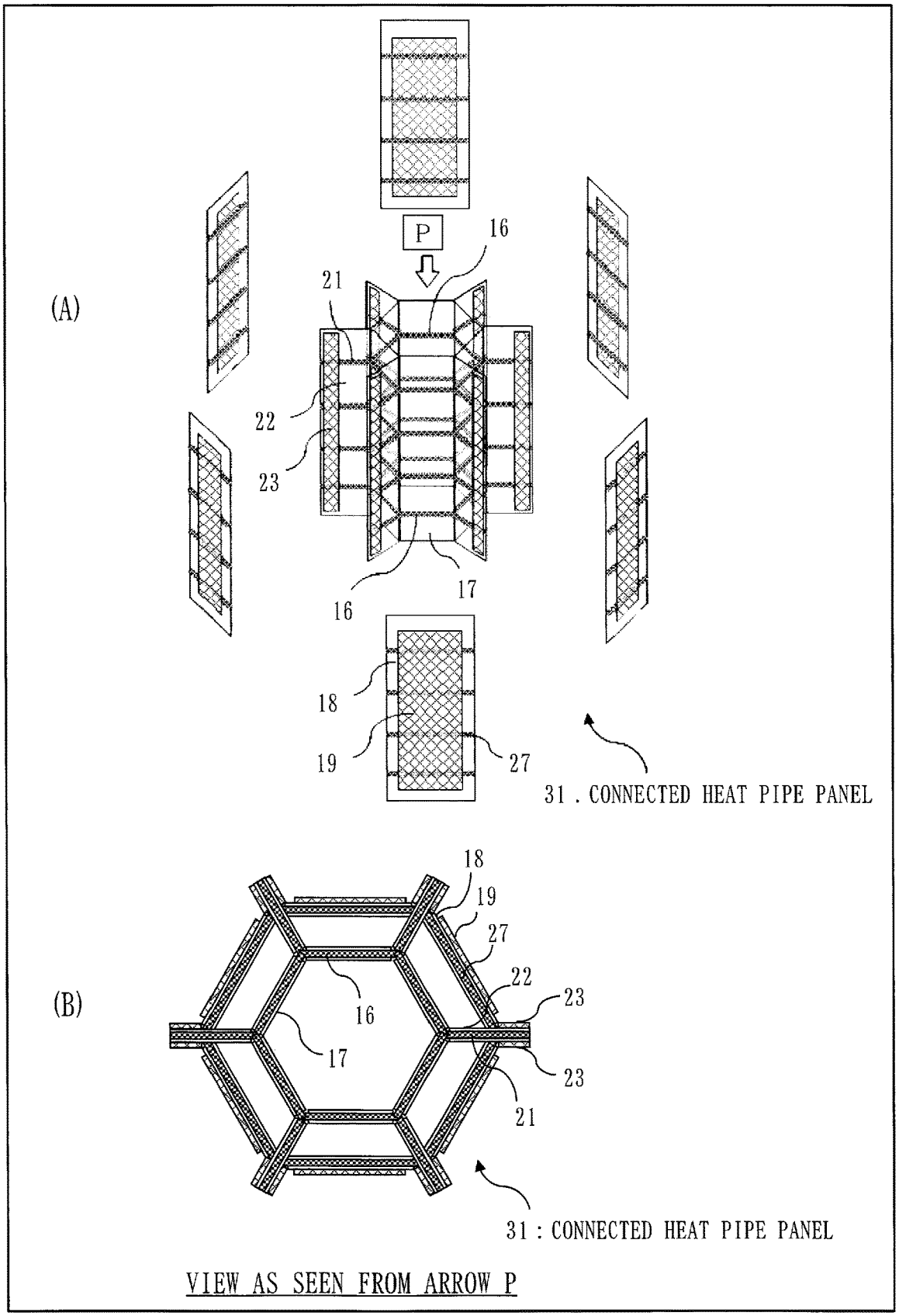
FIG. 16 is a structure view of the connected heat pipe panel 31 according to Embodiment 8. (A) of FIG. 16 is a perspective view of the connected heat pipe panel 31. (B) of FIG. 16 is a view of the connected heat pipe panel 31 as seen in a direction of an arrow P in (A) of FIG. 16.

FIG. 16 is a structure view of the connected heat pipe panel 31 according to Embodiment 8, in which only the connected heat pipe panel 31 is illustrated from the drawing in FIG. 15.

The connected heat pipe panel 31 according to Embodiment 8 has a structure in which the webbed panels 22 having the heat radiation surfaces 23, which are radially arranged at corners of the connected heat pipe panel 20 according to Embodiment 5, and the heat pipes 21 built in the webbed panel 22 are thermally connected to the inner panels 17 and the heat pipes 16 built in the inner panels 17 as well as thermally connected also to the outer panels 18 having the heat radiation surfaces 19 and the heat pipes 27 built in the outer panel 18.

Next, the operation will be explained with reference to FIG. 15 and FIG. 16.

Heat generated in plural apparatuses 1 installed in the inner panels 17 is transmitted to the webbed panels 22 and the outer panels 18 through the heat pipes 16, the heat pipes 21 and the heat pipes 27, and is radiated from the heat radiation surface 23 of the webbed panel 22 and the heat radiation surface 19 of the outer panels 18 to the space.

The connected heat pipe panel 31 including the inner panels 17, the webbed panels 22 and the outer panels 18 according to Embodiment 8 is characterized in that the heat pipes 16 horizontally arranged and built in the inner panels 17 are thermally connected at plural places in the circumferential direction, the heat pipes 21 thermally connected to the heat pipes 16 and built in the webbed panels 22 are extended to the heat radiation surface 23 of the webbed panels 22, and the heat pipes 27 thermally connected to the heat pipes 21 and built in the outer panels 18 are extended to the heat radiation surfaces 19 of the outer panels 18. The other components are the same as those of Embodiments 4, 6 and 7.

As the connected heat pipe panel 31 according to Embodiment 8 has heat radiation surfaces on both the webbed panels 22 and the outer panels 18 in which the heat pipes are built, there is an advantage that heat radiation ability is higher than Embodiment 7.

Figure 19:
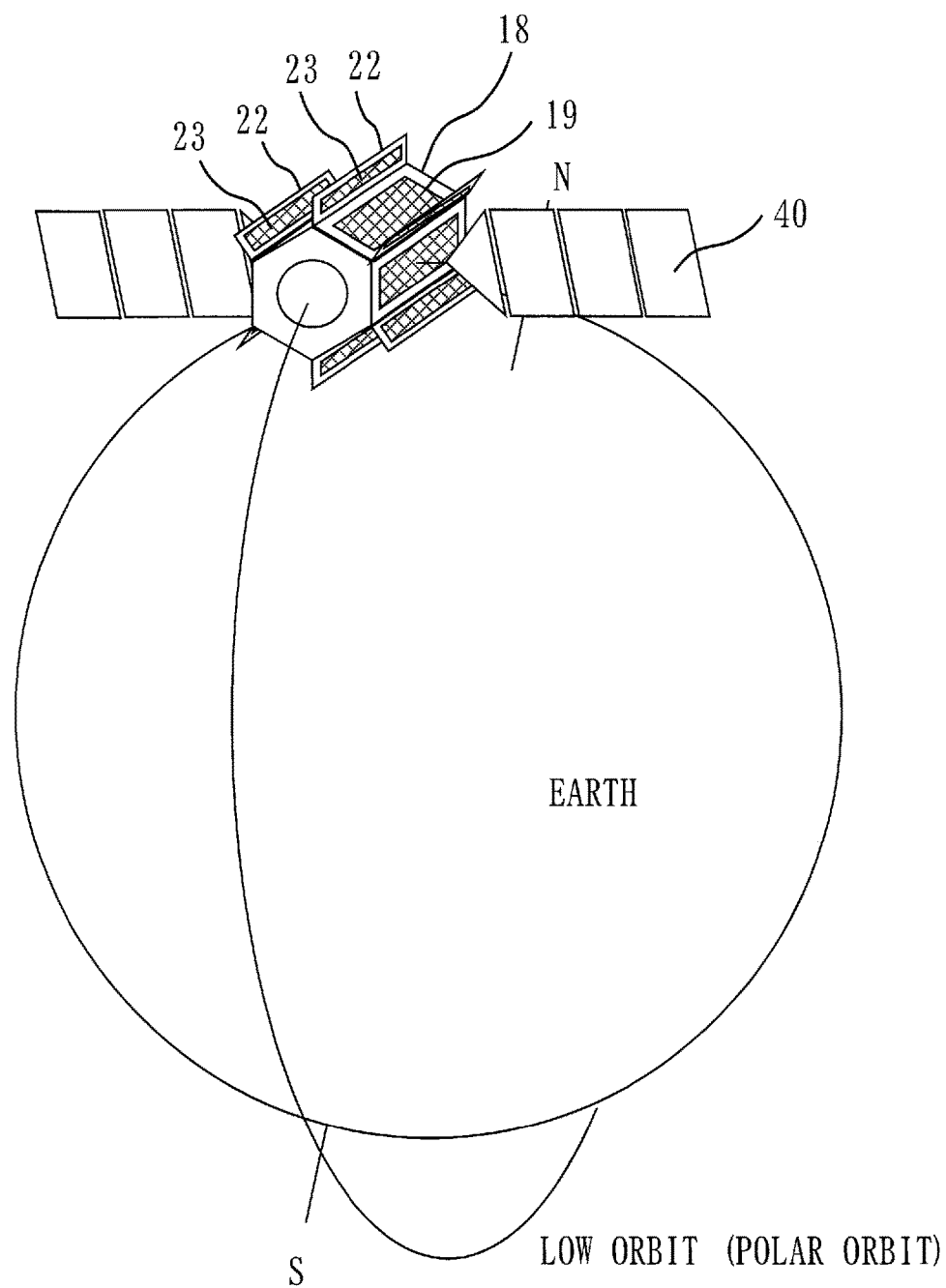
FIG. 19 is a conceptual diagram of a low orbit satellite on an orbit according to Embodiment 8.
Figure 19:
Figure 20:
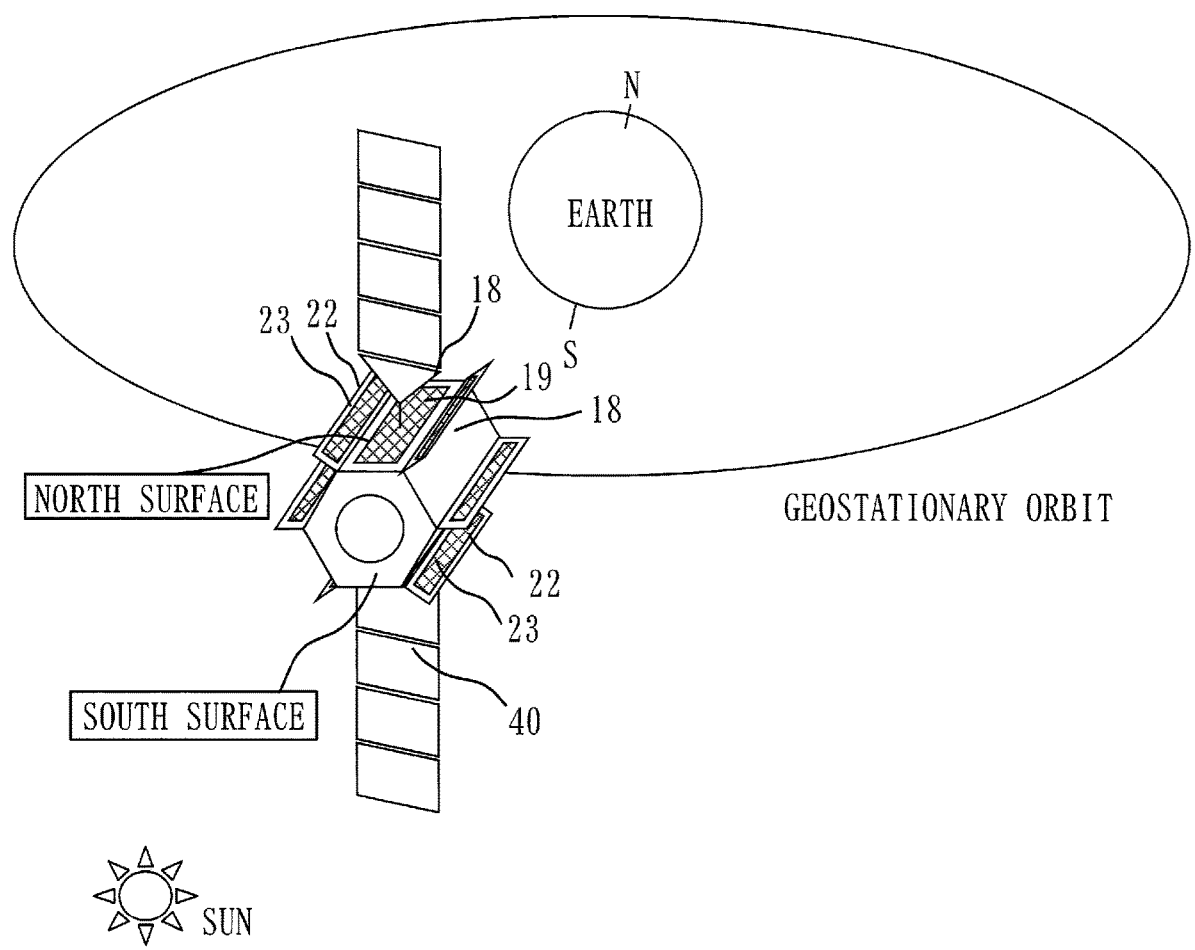
FIG. 20 is a conceptual diagram of a geostationary satellite on an orbit according to Embodiment 8.

The same thermal structure design and equipment layout design can be applied even when a satellite on which the connected heat pipe panel 31 according to the present embodiment is mounted is a low orbit satellite (see FIG. 19) or a geostationary satellite (FIG. 20), thereby standardizing mechanical system design and reducing the development period and costs.

Embodiment 9

Embodiment 9 differs from Embodiments 1 to 8 in that heat pipes for connection that connect the plural heat pipes 2 connected in circumferential direction are built in the inner panels 3.

Hereinafter, the different from Embodiments 1 to 8 will be explained in Embodiment 9. Items explanation of which is omitted are the same as those in Embodiments 1 to 8. In Embodiment 9, a structure in which heat pipes for connection are added to the components of Embodiment 1 will be explained as an example. However, it is also possible to add the heat pipes for connection to components of other embodiments, not limited to components of Embodiment 1.

Figure 24:
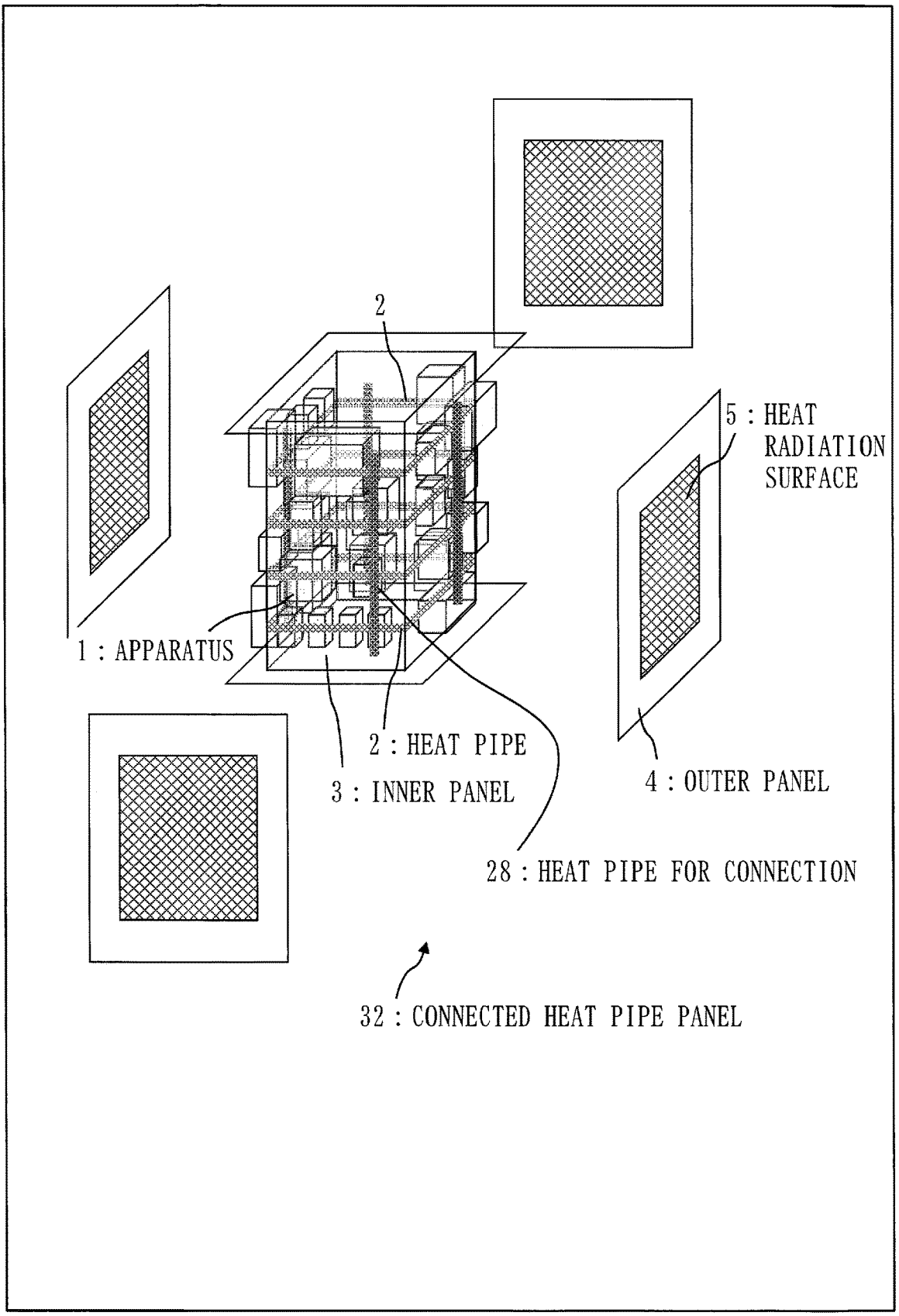
FIG. 24 is a structure view of a heat radiator including a connected heat pipe panel 32 according to Embodiment 9, which is the structure view of the heat radiator illustrating a state where the outer panels 4 are removed.

FIG. 24 is a structure view of a heat radiator including a connected heat pipe panel 32 according to Embodiment 9. In FIG. 24, 28 denotes heat pipes for connection that connect plural heat pipes 2.

Figure 25:
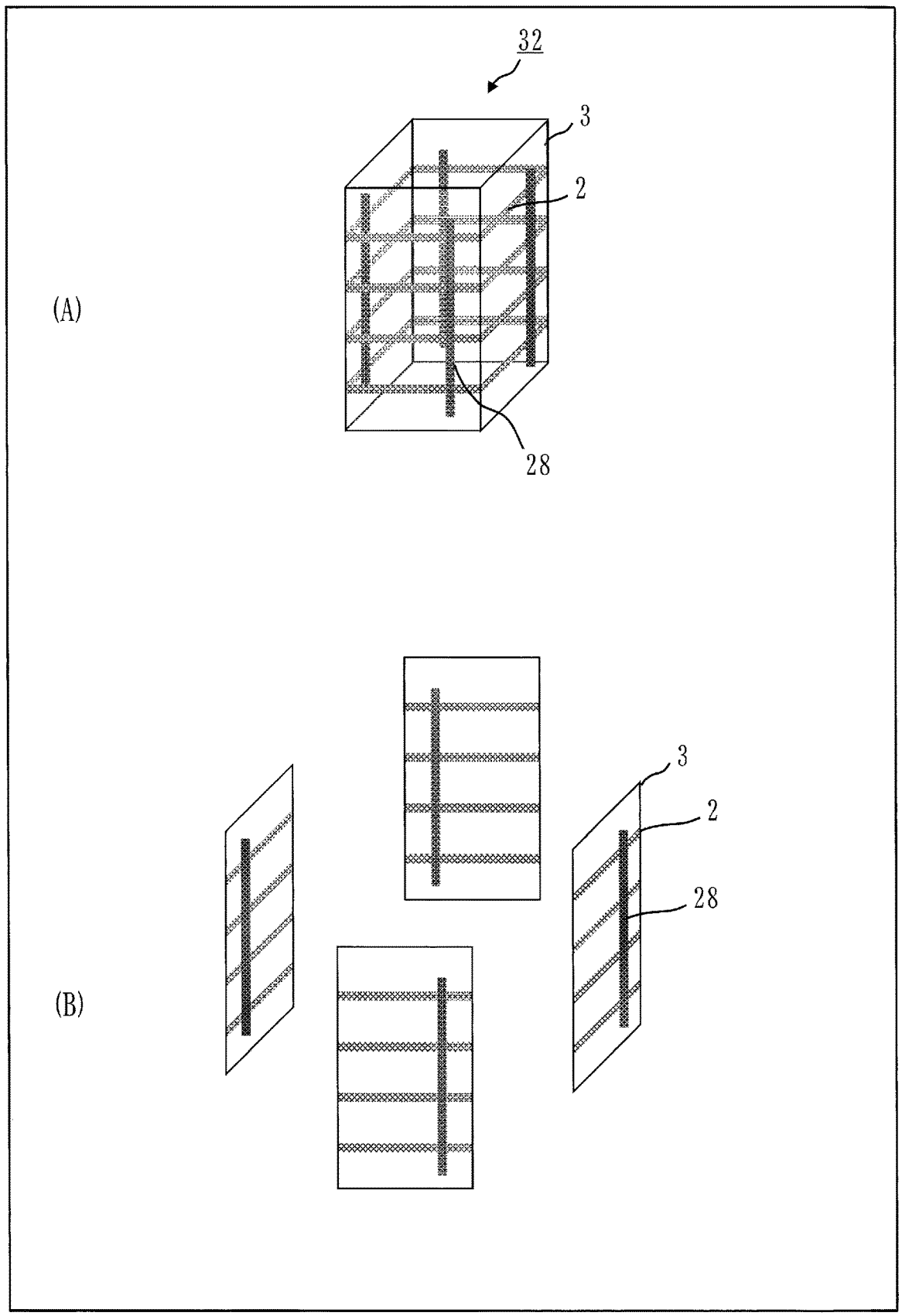
FIG. 25 is a structure view of the connected heat pipe panel 32 according to Embodiment 9. (A) of FIG. 25 is a perspective view of the connected heat pipe panel 32. (B) of FIG. 25 is a view illustrating a state where respective inner panels 3 are disassembled.

FIG. 25 is a structure view of the connected heat pipe panel 32 according to Embodiment 9, in which only the connected heat pipe panel 32 is illustrated from the drawing in FIG. 24.

In the connected heat pipe panel 32 according to Embodiment 9, the heat pipes for connection 28 that connect the plural heat pipes 2 according to Embodiment 1 connected in the circumferential direction are built in the inner panels 3. According to this structure, the connected heat pipe panel 32 has a structure in which the respective heat pipes 2 are thermally connected by the heat pipes for connection 28.

In the connected heat pipe panel 32, the respective heat pipes 2 are connected in a vertical direction by the linear-shaped heat pipes 28.

The operation will be explained with reference to FIG. 24 and FIG. 25.

Heat generated in the plural apparatuses 1 attached to the inner panels 3 is diffused in the circumferential direction of the inner panels 3 through the heat pipes 2 and diffused in the vertical direction of the inner panels 3 through the heat pipes for connection 28. After that, the heat is transmitted to the outer panels 4 by radiation and is radiated from the heat radiation surfaces 5 provided on the space side of the outer panels 4 to the space.

Figure 26:
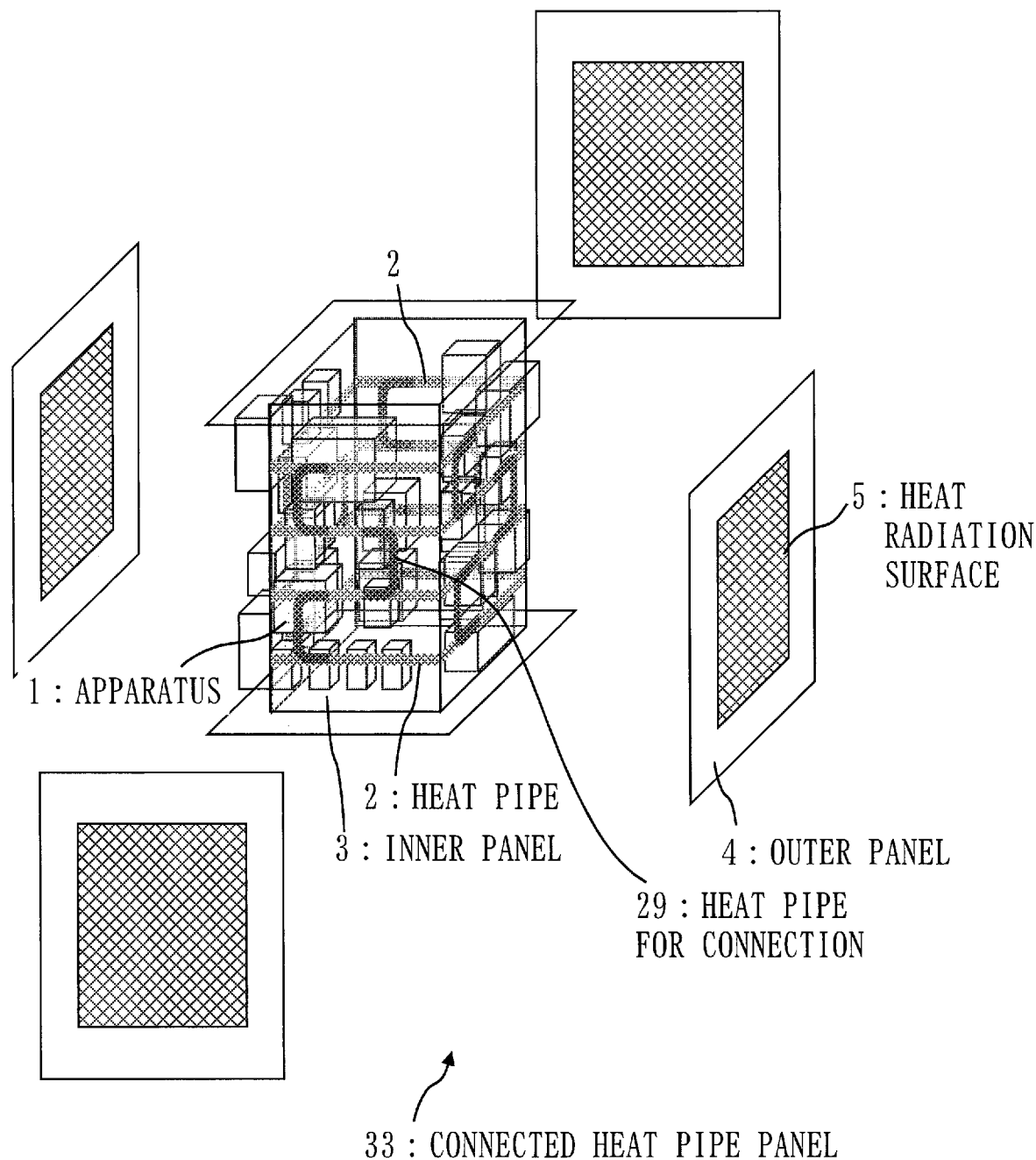
FIG. 26 is a structure view of a heat radiator including a connected heat pipe panel 33 according to Embodiment 9, which is the structure view of the heat radiator illustrating a state where the outer panels 4 are removed.

FIG. 26 is a structure view of a heat radiator including a connected heat pipe panel 33 according to Embodiment 9. In FIG. 26, 29 denotes heat pipes for connection that connect the plural heat pipes 2.

Figure 27:
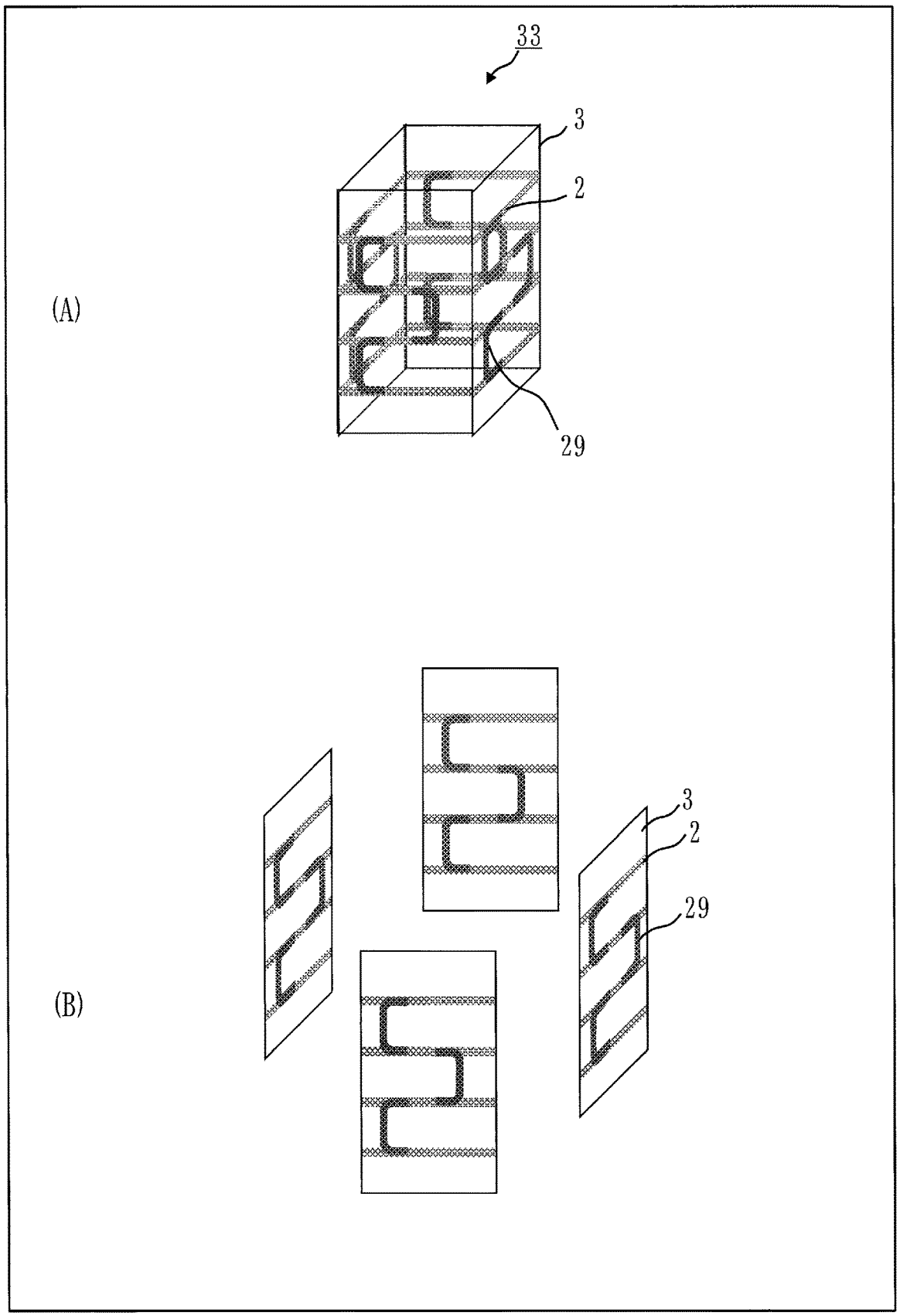
FIG. 27 is a structure view of the connected heat pipe panel 33 according to Embodiment 9. (A) of FIG. 27 is a perspective view of the connected heat pipe panel 33. (B) of FIG. 27 is a view illustrating a state where respective inner panels 3 are disassembled.

FIG. 27 is a structure view of the connected heat pipe panel 33 according to Embodiment 9, in which only the connected heat pipe panel 33 is illustrated from the drawing in FIG. 26.

In the connected heat panel 33, adjacent heat pipes 2 are connected in the vertical direction by the heat pipes 29 that are bent in a U-shape.

In the case where the respective heat pipes 2 are connected in the vertical direction by the linear-shaped heat pipes 28 in a straight line such as in the connected heat pipe panel 32, a working medium such as ammonia sealed in the heat pipe 28 falls on the ground due to gravity. Accordingly, heat transport by the heat pipes 28 does not function in a test performed on the ground. As there is no effect by gravity on an orbit, heat transport by the heat pipes 28 can function.

On the other hand, in the case where the adjacent heat pipes 2 are connected in the vertical direction by the U-shaped heat pipes 29 such as in the connected heat pipe panel 33, the working medium sealed in the heat pipes 29 falls up to the vicinity of the lower-side heat pipe 2 due to gravity. Accordingly, heat transport from the lower-side heat pipe 2 to the upper-side heat pipe 2 functions even in the test performed on the ground. That is, the heat transport by the heat pipes 28 can function in the test performed on the ground in a bottom heat mode.

The number of the heat pipes for connection 28 and 29 is not specified.

As described above, the connected heat pipe panels 32, 33 according to Embodiment 9 are characterized in that the plural heat pipes 2 horizontally arranged and built in the inner panels 3 are connected in the vertical direction by the heat pipes 28 or the heat pipes 29.

According to the above, it is possible to reduce a temperature difference generated between the plural heat pipes 2 that are horizontally arranged and to radiate heat efficiently.

Embodiment 10

Embodiment 10 differs from Embodiments 1 to 9 in that thermal emissivity on the heat radiation surfaces of the heat radiator is changed according to temperature.

Hereinafter, the different from Embodiments 1 to 9 will be explained in Embodiment 10. Items explanation of which is omitted are the same as those in Embodiments 1 to 9. In Embodiment 10, a structure in which thermal emissivity of the heat radiation surfaces 9 according to Embodiment 2 is changed according to temperature will be explained as an example. However, it is also possible to change thermal emissivity of the heat radiation surfaces of other embodiments according to temperature, not limited to the heat radiation surfaces 9 of Embodiment 2.

In Embodiment 10, the heat radiator has a function of changing the thermal emissivity of the heat radiation surfaces 9 according to temperature. Specifically, the lower the temperature is, the lower the thermal emissivity of the heat radiation surfaces 9 is set to thereby increase heat insulation performance as well as the higher the temperature is, the higher the thermal emissivity of the heat radiation surfaces 9 is set to thereby increase heat radiation performance.

Figure 28:
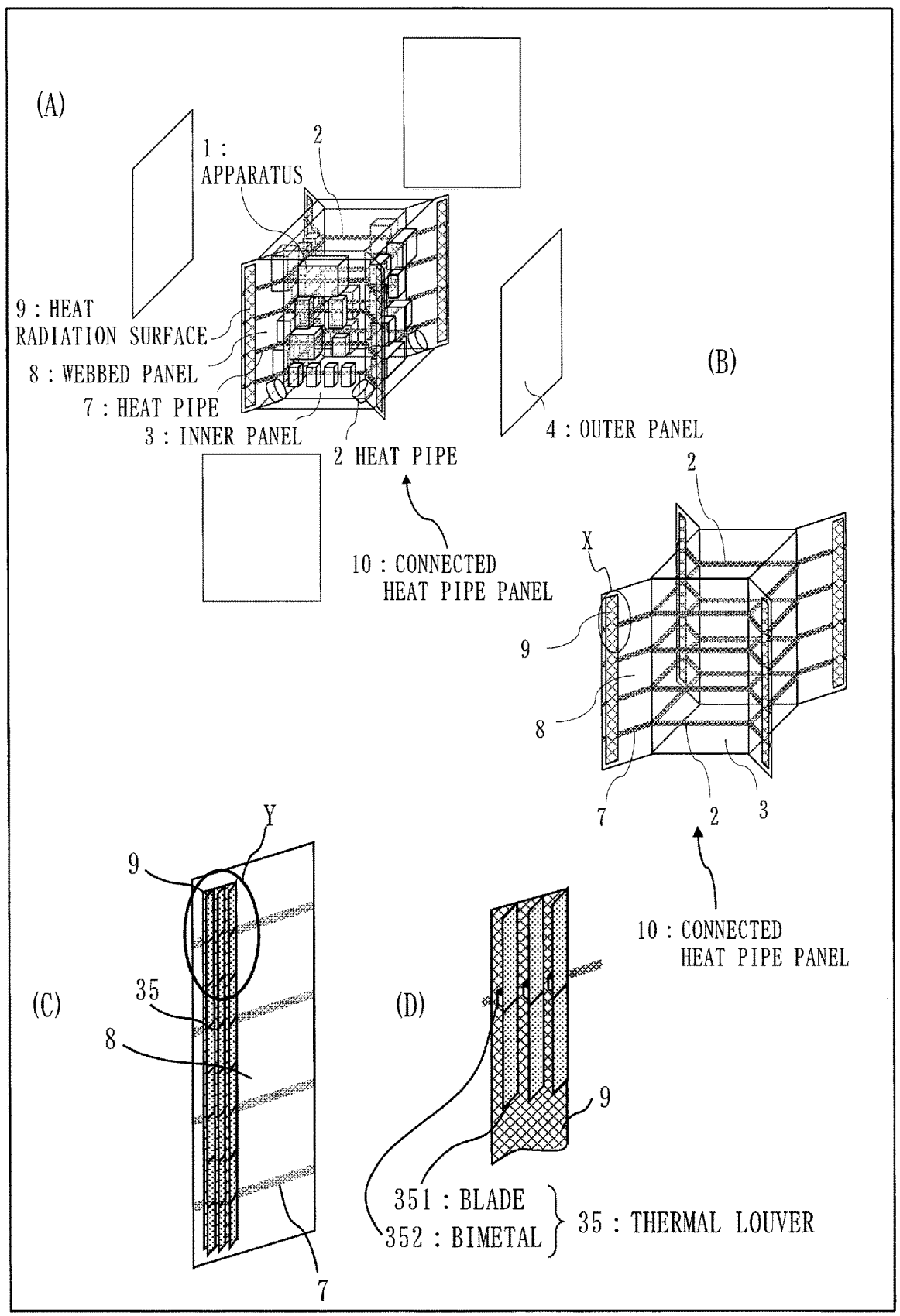
FIG. 28 is a structure view of a heat radiator including a connected heat pipe panel 34 according to Embodiment 10. (A) of FIG. 28 is a perspective view illustrating a state where the outer panels 4 are removed from the heat radiator and is the perspective view drawn so that internal components are seen. (B) of FIG. 28 is a perspective view of the connected heat pipe panel 34. (C) of FIG. 28 is an enlarged view of a target portion X in (B) of FIG. 28. (D) of FIG. 28 is an enlarged view of a target portion Y in (C) of FIG. 28.

As a method of realizing the function, there are a method in which emissivity variable elements the thermal emissivity of which changes according to temperature are adhered to the heat radiation surfaces 9 and a method in which an apparatus such as a thermal louver 35 is attached to the heat radiation surface 9 of a connected heat pipe panel 34 as shown in (C) of FIG. 28 and the area on the heat radiation surface 9 to be exposed to the outside is changed according to temperature. It is possible to adopt both of these two methods.

As shown in FIG. 28, the thermal louver 35 is configured so that plural blades 351 are respectively fixed to shafts by bimetals 352. The bimetals 352 generate rotational force when the temperature is increased and rotate the blades 351, thereby increasing the area on the heat radiation surface 9 positioned on the back surface of the blades 351 to be exposed to the outside. When the blades 351 of the thermal louver 35 are formed of a multi-layer insulation (MLI) structure, heat insulation performance obtained when the blades 351 are closed can be increased. Accordingly, variation in thermal emissivity by opening and closing the blades can be increased and design in a function of automatic temperature adjustment by the heat radiation surfaces 9 can be performed easily.

As described above, the heat radiator according to Embodiment 10 is characterized by having the function of changing the thermal emissivity of the heat radiation surfaces 9 according to temperature.

There are cases that the heat generation amount of the apparatuses 1 differ according to each satellite and that the heat generation amount varies by switching on and off the apparatuses 1. According to the above structure, thermal design can be standardized and the device can be used in any satellite.

Embodiment 11

Embodiment 11 differs from Embodiments 1 to 10 in that the heat radiator has a function of transforming heat to heat radiation surfaces from the heat pipes of the inner panels.

Hereinafter, the different from Embodiments 1 to 10 will be explained in Embodiment 11. Items explanation of which is omitted are the same as those in Embodiments 1 to 10. In Embodiment 11, a structure in which the function of transporting heat is added to the structure of Embodiment 2 or Embodiment 3 will be explained as an example. However, it is also possible to add the function of transporting heat to structures of other embodiments, not limited to the structure of Embodiment 2 or Embodiment 3.

Figure 29:
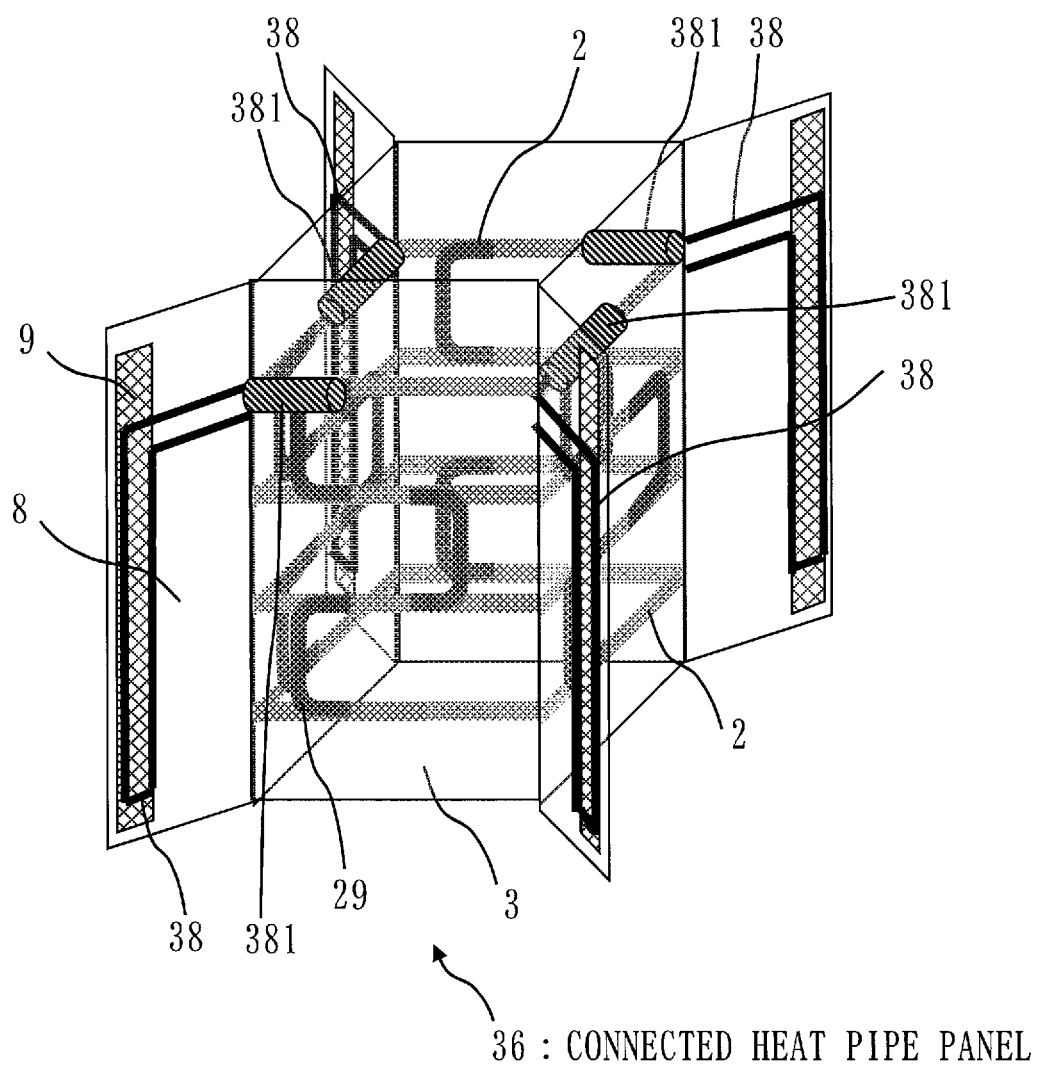
FIG. 29 is a structure view of a heat radiator including a connected heat pipe panel 36 according to Embodiment 11, which is the structure view of the heat radiator illustrating a state where the outer panels 4 are removed.
Figure 30:
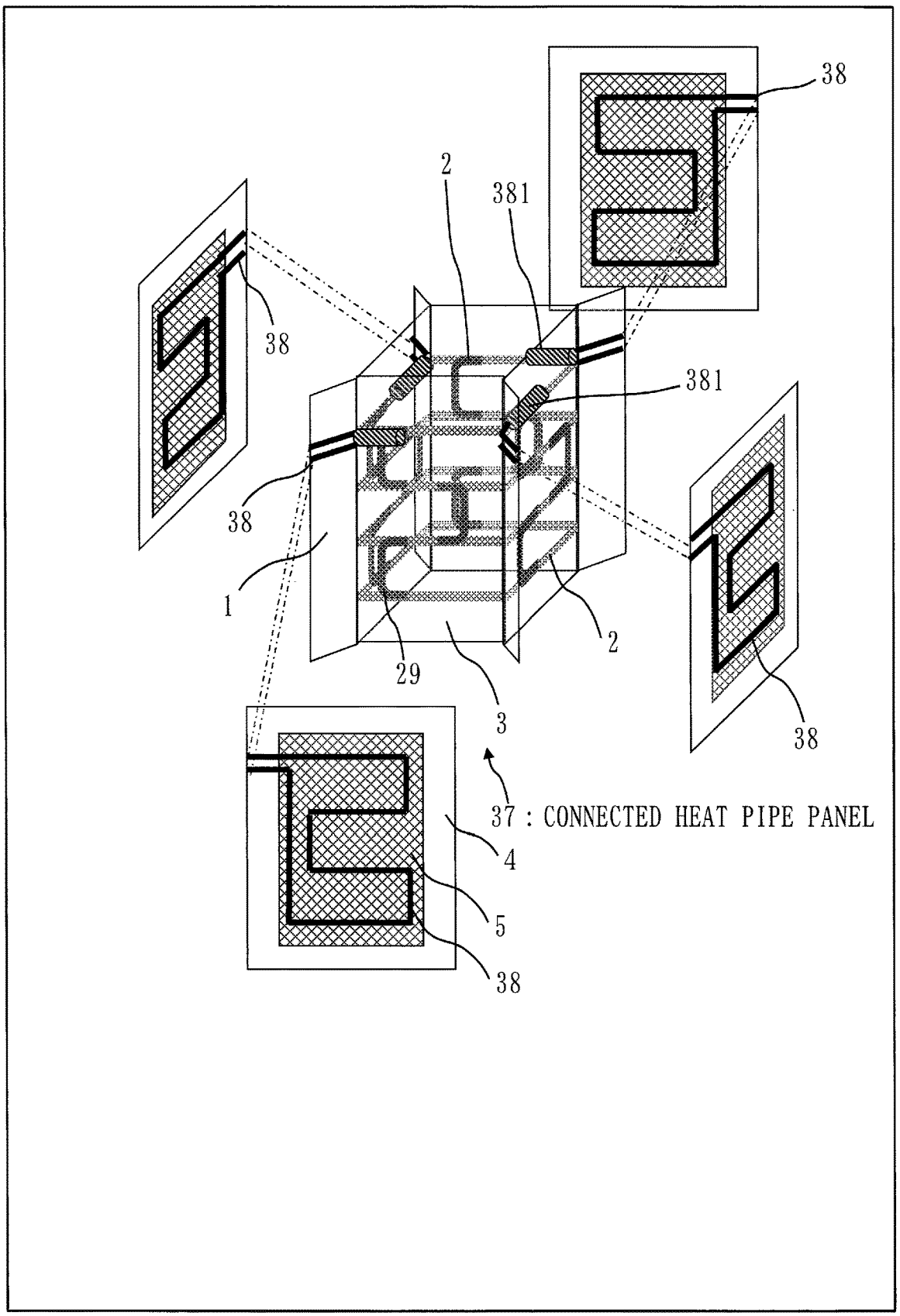
FIG. 30 is a structure view of a heat radiator including a connected heat pipe panel 37 according to Embodiment 11, which is the structure view of the heat radiator illustrating a state where the outer panels 4 are removed.

FIG. 29 and FIG. 30 are structure views of connected heat pipe panels 36 and 37 according to Embodiment 11. In FIG. 29 and FIG. 30, 29 denotes heat pipes for connection that connect the plural heat pipes 2 and 38 denotes loop heat pipes having the function of transporting heat.

FIG. 29 illustrates a structure of the connected heat pipe panel 36 in which the loop heat pipes 38 are added to the structure of Embodiment 2. FIG. 30 illustrates a structure of the connected heat pipe panel 37 in which the loop heat pipes 38 are added to the structure of Embodiment 3.

In the connected heat pipe panels 36 and 37 according to Embodiment 11, the heat pipes for connection 29 explained in Embodiment 9 are built in the inner panels 3. That is, the connected heat pipe panels 36 and 37 are configured so that the heat pipes for connection 29 that connect the plural heat pipes 2 connected in the circumferential direction according to Embodiment 2 are built in the inner panels 3. Note that the heat pipes 28 explained in Embodiment 9 may be used instead of the heat pipes 29.

Also, in the connected heat pipe panel 36, the annular loop heat pipes 38 passing through the back side of the heat radiation surfaces 9 are built in the webbed panels 8. In the connected heat pipe panel 37, the annular loop heat pipes 38 passing through the back side of the heat radiation surfaces 5 are built in the outer panels 4. Each loop heat pipe 38 is provided with an evaporator 381. The evaporator 381 is connected to the heat pipe 2.

The operation will be explained with reference to FIG. 29 and FIG. 30.

When the evaporators 381 provided in the connected heat pipe panels 36 and 37 are heated through the heat pipes 2, a capillary force is generated and allows a working medium in tubes 382 of the loop heat pipes 38 to circulate in a fixed direction. Accordingly, heat transmitted from the heat pipes 2 is transmitted to the heat radiation surfaces 5 and 9 through the working medium and is radiated. On the other hand, as the capillary force is not generated when the evaporators 381 are not heated through the heat pipes 2, the working medium does not circulate. Therefore, the heat is not transported to the heat radiation surfaces 5 and 9 and heat radiation from the heat radiation surfaces 5 and 9 can be suppressed.

As described above, the heat radiator according to Embodiment 11 is characterized by having the function of transporting heat from the heat pipes in the inner panels to the heat radiation surfaces.

There are cases that the heat generation amount of the apparatuses 1 differ according to each satellite and that the heat generation amount varies by switching on and off the apparatuses 1. According to the above structure, thermal design can be standardized and the device can be used in any satellite.

Embodiment 12

In Embodiment 12, a method of connecting heat pipes will be explained.

Figure 31:
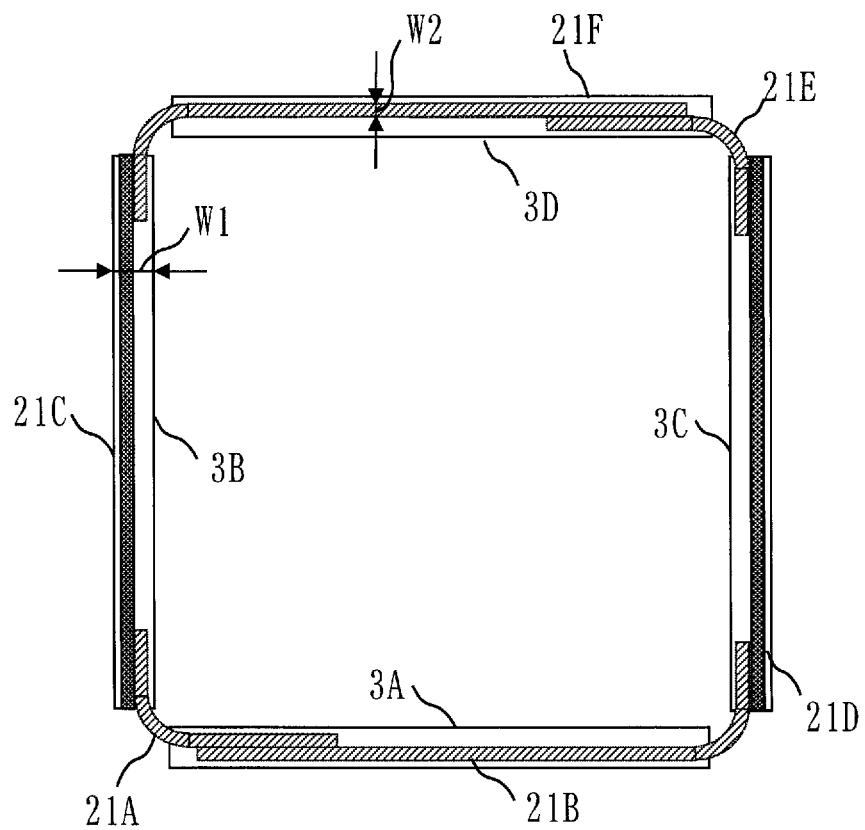
FIG. 31 is a structure view of the connected heat pipe panel 6 according to Embodiment 12.
Figure 32:
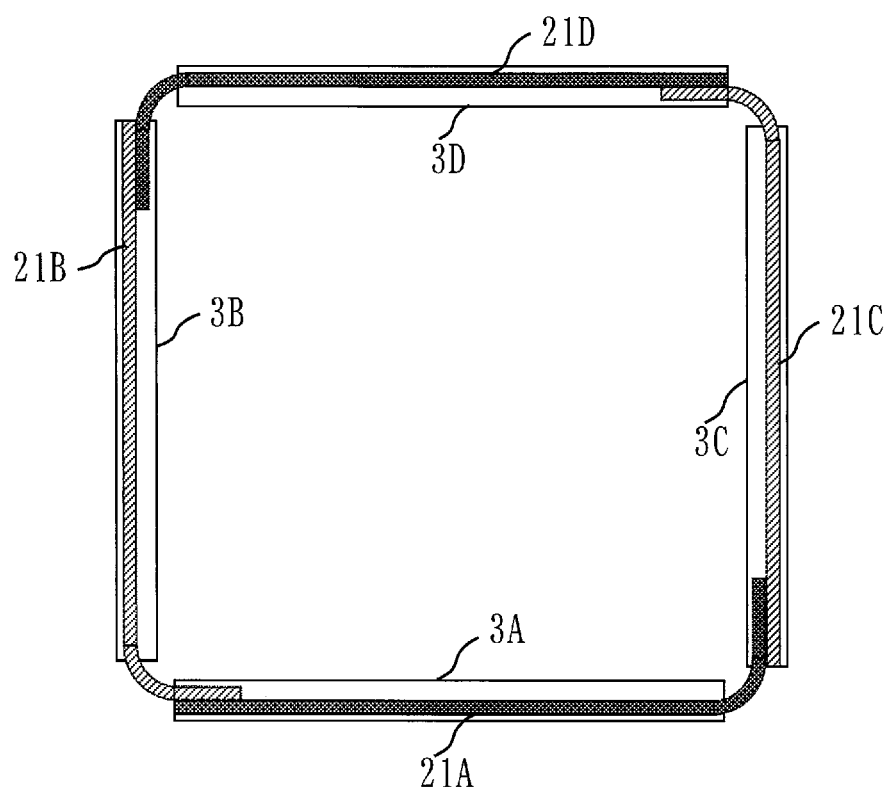
FIG. 32 is a structure view of the connected heat pipe panel 6 according to Embodiment 12.

FIG. 31 and FIG. 32 are views illustrating the structure of the connected heat pipe panel 6 illustrated in (B) of FIG. 2 in detail.

A thickness W1 of the inner panel 3 is twice as large as a thickness W2 of the heat pipe 2. Accordingly, two heat pipes 2 can be built in the inner panel 3 in an overlapping state in a thickness direction of the inner panel 3.

The heat pipe 2 is formed by joining the plural pipes 21. In FIG. 31, both ends of the bent pipes 21 are joined to other pipes 21 built in the same inner panel 3. The pipes 21 are thermally connected to each other by joining the pipes 21 to each other. Flanges are formed at joints, and the pipes 21 are joined by bolts or the like. Accordingly, working medium is not circulated in the joined pipes 21.

For example, a pipe 21A is bent and built in an inner panel 3A in FIG. 31. Then, one end of the pipe 21A is joined to a pipe 21B built in the inner panel 3A and the other end is joined to a pipe 21C built in an inner panel 3B. The pipe 21B is bent and joined to a pipe 21D built in an inner panel 3C. Similarly, the pipe 21D is joined to a pipe 21E, the pipe 21E is joined to a pipe 21F and the pipe 21F is joined to the pipe 21C. Accordingly, the heat pipe 2 is in a state of being thermally connected in the circumferential direction.

In FIG. 32, the heat pipe 2 is formed by the number of heat pipes and the number of joined places that are less than those in FIG. 31. According to the structure, the temperature difference in four surfaces of the inner panels can be reduced as compared with FIG. 31 and weight can be reduced.

The reason why the heat pipe 2 is formed by joining the plural heat pipes 21 is that it is difficult to process the heat pipe 2 accurately when the heat pipe 2 is bent at plural places because of its structure of the heat pipe 2. An inner wall of the heat pipe 2 has a capillary structure so that the working medium moves by the capillary force. Accordingly, bending is difficult and it is difficult to form the heat pipe 2 connected in the circumferential direction by one pipe 21 accurately.

Figure 33:
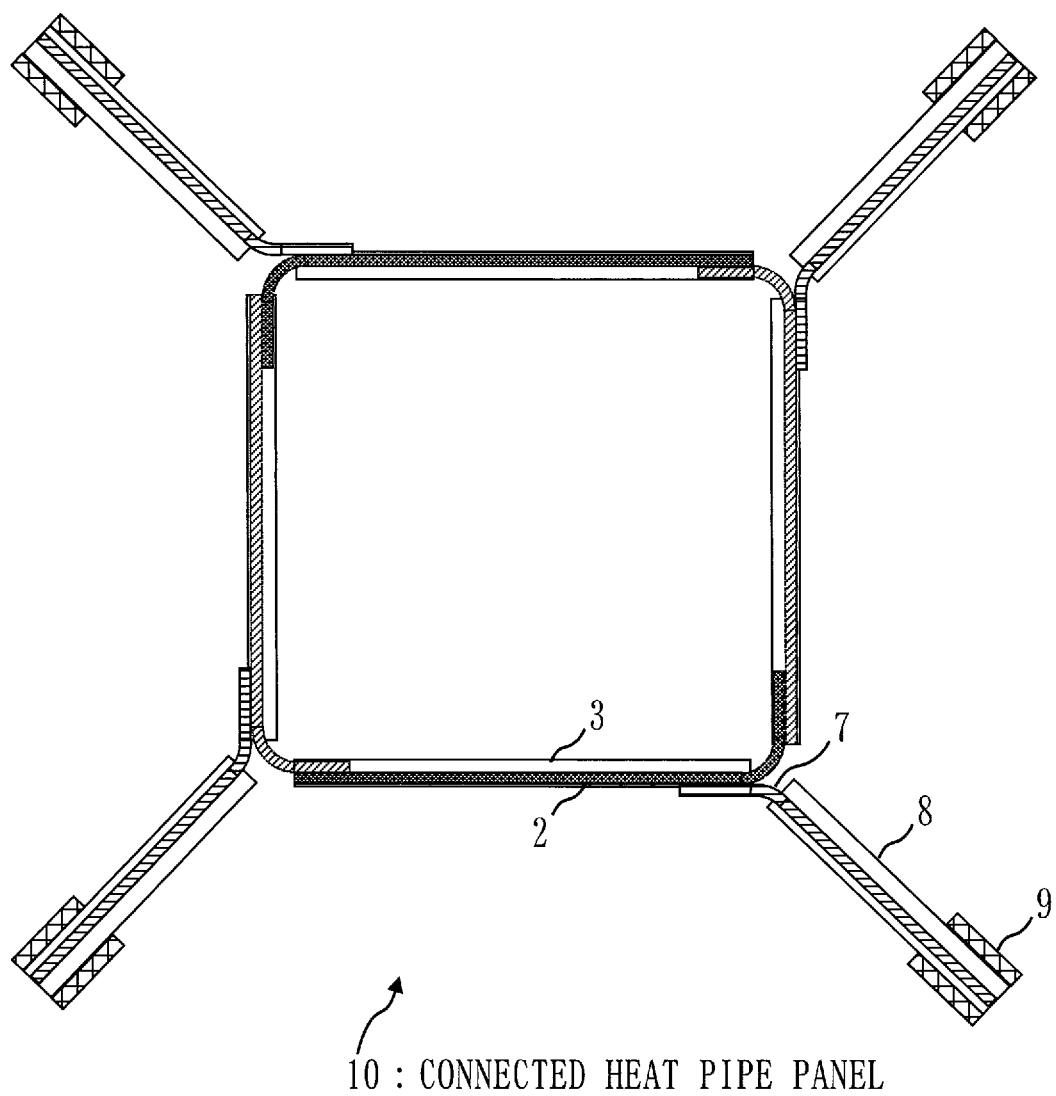
FIG. 33 is a structure view of the connected heat pipe panel 10 according to Embodiment 12.

FIG. 33 is a view illustrating a structure of the connected heat pipe panel 10 illustrated in (B) of FIG. 4.

One end of the heat pipe 7 built in the webbed panel 8 is joined to the heat pipe 2 built in the inner panel 3, and the heat pipe 2 and the heat pipe 7 are thermally connected. In FIG. 33, the heat pipe 7 is fixed to the heat pipe 2 by, for example, a bolt from the outer side of the inner panel 3. At this time, a skin of a honeycomb panel forming the inner panel 3 is cut out, and then the heat pipe 7 and the heat pipe 2 are fixed by a bolt. The heat pipe 7 and the heat pipe 2 may be fixed by a bolt without cutting the skin of the honeycomb panel. Although a process of thermally connecting the heat pipe 7 and the heat pipe 2 is simplified in this case, thermal resistance occurs.

A method of thermally connecting to the heat pipe 13 built in the outer panel 4 is the same as the method of thermally connecting the heat pipe 2 built in the inner panel 3 to the heat pipe 7 built in the webbed panel 8.

Figure 34:
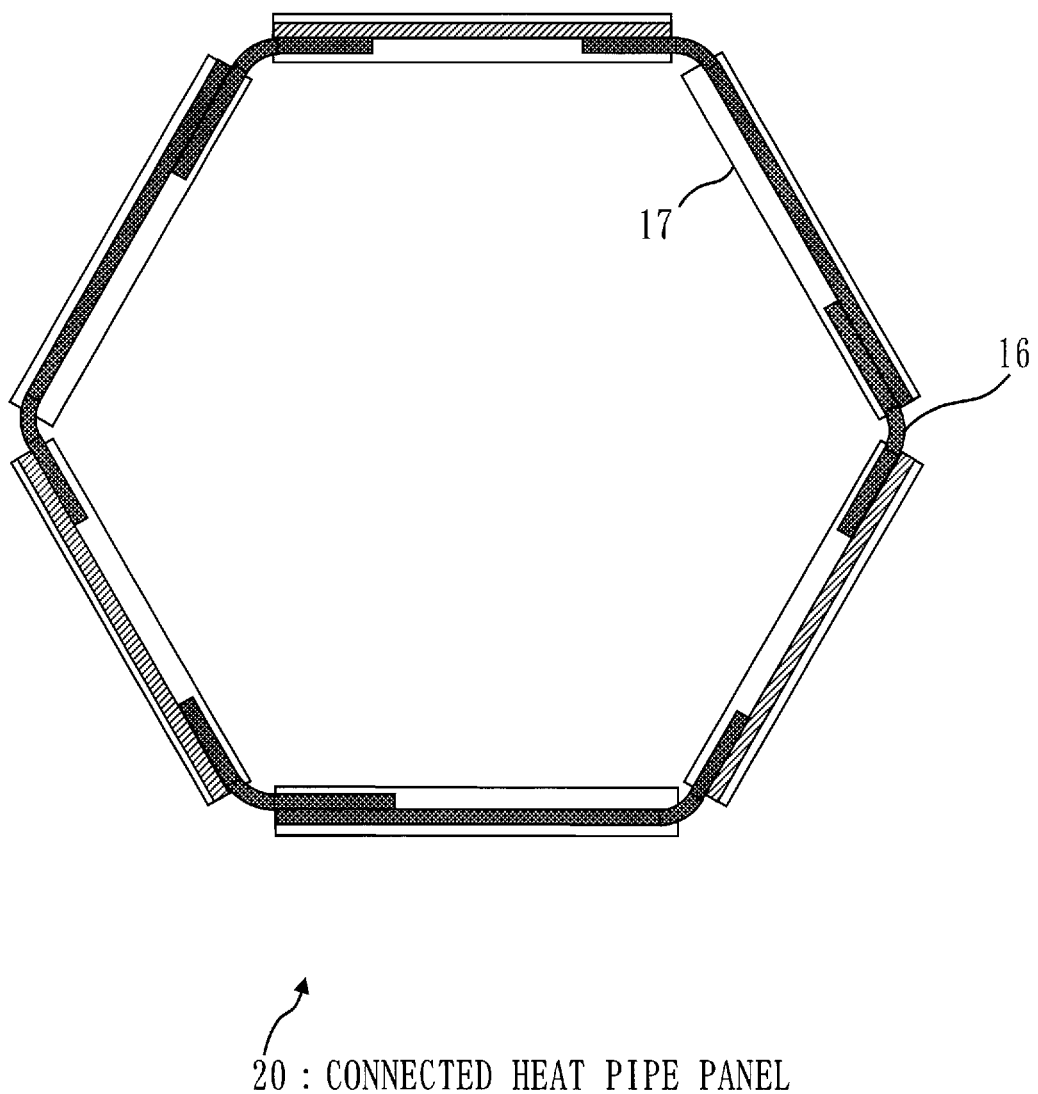
FIG. 34 is a structure view of the connected heat pipe panel 20 according to Embodiment 12.
Figure 35:
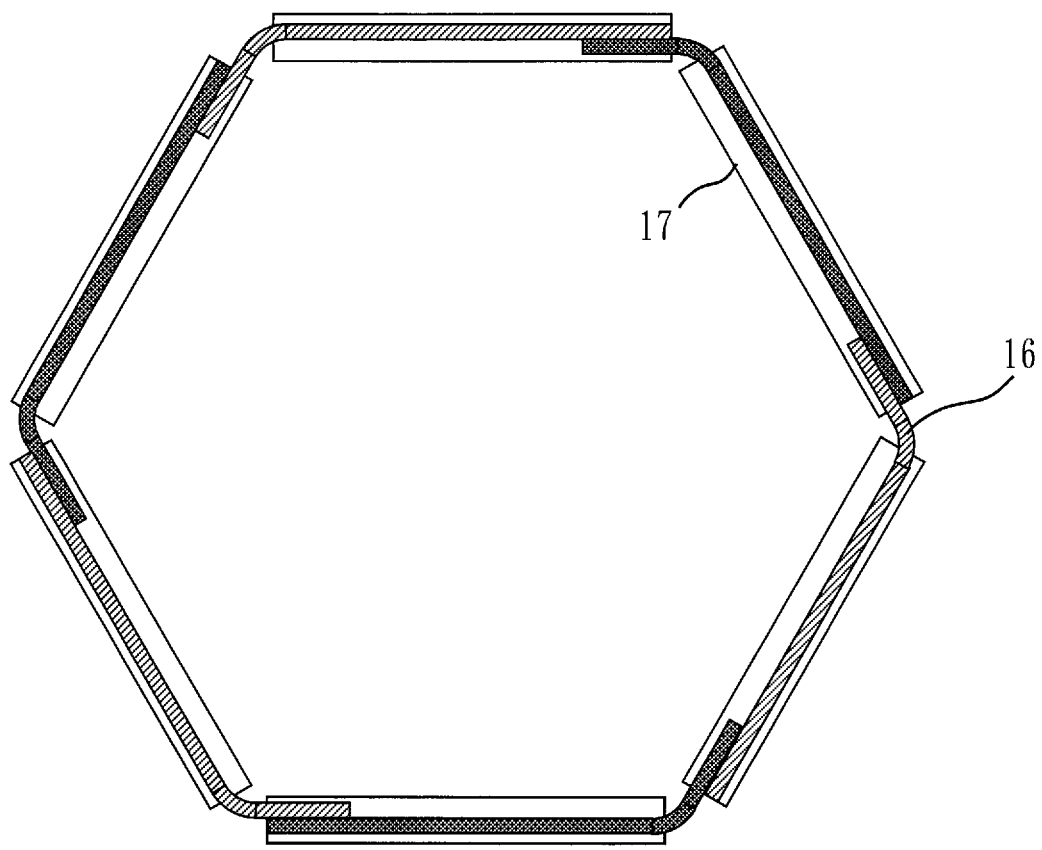
FIG. 35 is a structure view of the connected heat pipe panel 20 according to Embodiment 12.

FIG. 34 and FIG. 35 are views illustrating structures of the connected heat pipe panel 20 of six surfaces illustrated in (B) of FIG. 10 in detail, and a connecting method is the same as those of FIG. 31 and FIG. 32 in which the heat pipe panels of four surfaces are connected.

Figure 36:
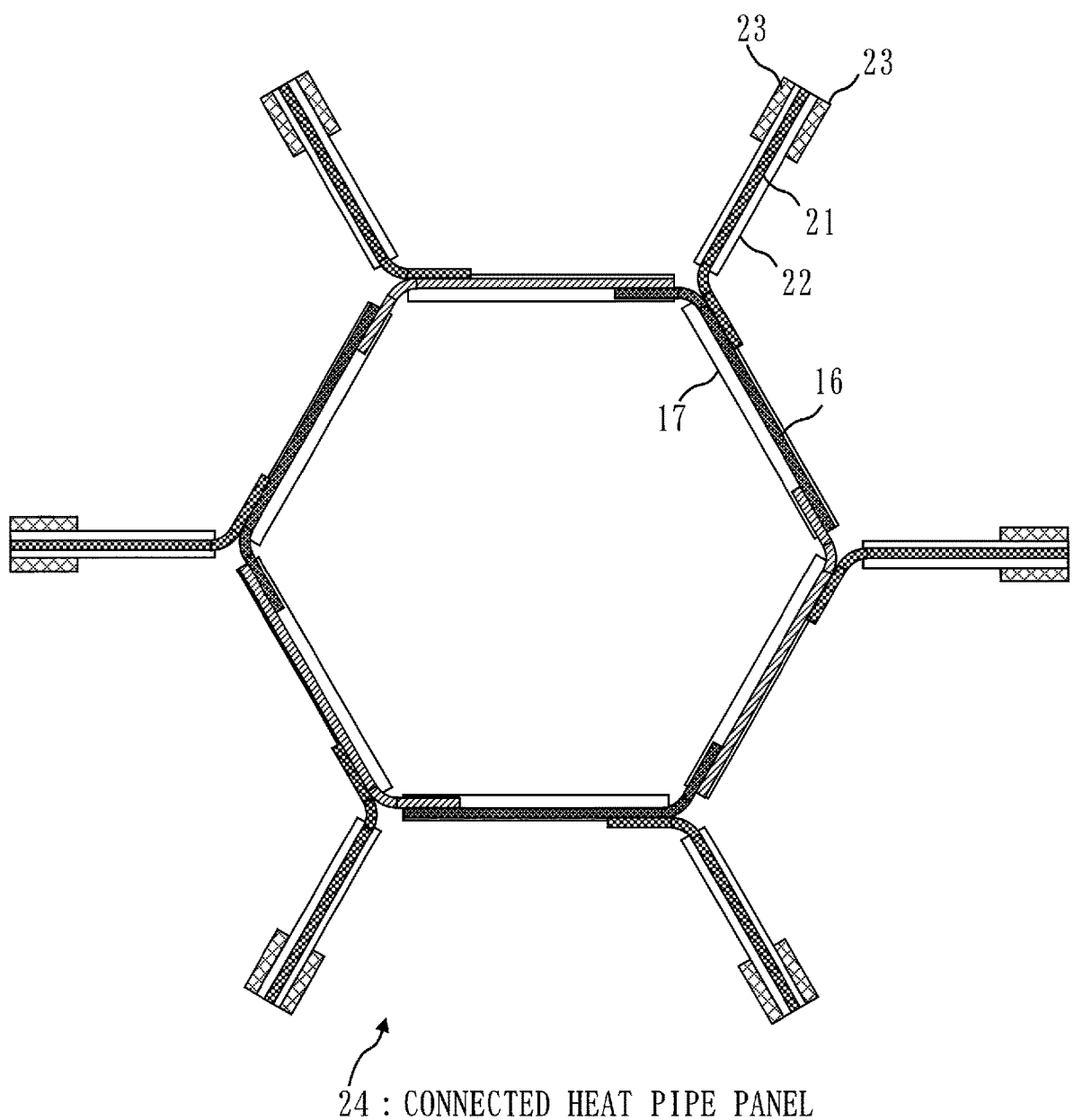
FIG. 36 is a structure view of the connected heat pipe panel 24 according to Embodiment 12.

FIG. 36 is a view illustrating the connected heat pipe panel 24 illustrated in (B) of FIG. 12 in detail, and a method of connecting the heat pipe 21 built in the webbed panel 22 and the heat pipe 16 built in the inner panel 17 is the same as that of FIG. 33.

A method of thermally connecting to the heat pipe 27 built in the outer panel 18 is also the same as the method of thermally connecting the heat pipe 16 built in the inner panel 17 to the heat pipe 21 built in the webbed panel 22.

Concerning the tube 382 explained in Embodiment 11, the capillary structure called a wick is not necessary in the tube 382, which is different from the heat pipe 2, as the working medium moves by the capillary force generated by the evaporator 381. Accordingly, tubes with good handleability can be used as the tubes 382.

In the heat radiator according to Embodiment 1 and so on, the apparatuses 1 are installed on the inner panels 3. Accordingly, the outer panels 4 can be used as shields for protecting the apparatuses 1 from the debris. That is, the apparatuses 1 can be protected from the debris by designing the thickness or strength of the outer panels 4 in accordance with assumed debris. This is not limited to Embodiment 1 and the same applies to other embodiments.

REFERENCE SIGNS LIST

1: apparatus, 2: heat pipe, 3: inner panel, 4: outer panel, 5: heat radiation surface, 6: connected heat pipe panel, 7: heat pipe, 8: webbed panel, 9: heat radiation surface, 10: connected heat pipe panel, 11: heat pipe, 12: webbed panel, 13: heat pipe, 14: connected heat pipe panel, 15: connected heat pipe panel, 16: heat pipe, 17: inner panel, 18: outer panel, 19: heat radiation surface, 20: connected heat pipe panel, 21: heat pipe, 22: webbed panel, 23: heat radiation surface, 24: connected heat pipe panel, 27: heat pipe, 28: heat pipe, 29: heat pipe, 30: connected heat pipe panel, 31: connected heat pipe panel, 32: connected heat pipe panel, 33: connected heat pipe panel, 34: connected heat pipe panel, 35: thermal louver, 341: blade, 342: bimetal, 36: connected heat pipe panel, 37: connected heat pipe panel, 38: loop heat pipe, 381: evaporator, 382: tube, 40: solar paddle, 50: heat pipe, 51: structure panel, 52: heat radiation surface, 53: heat pipe, 54: structure panel, 55: heat radiation surface.

The invention claimed is:

1. A heat radiator using a heat pipe panel comprising:
an inner panel, wherein a plurality of heat pipes are incorporated into the inner panel in a ring-like manner such that the plurality of heat pipes are connected horizontally in a circumferential direction; and
an outer panel surrounding the inner panel,
wherein the inner panel is designed to be arrangeable around a structure of an artificial satellite or a structure of a spacecraft, and
wherein an apparatus is mounted on an outer surface of the inner panel facing an inner surface of the outer panel between the inner panel and the outer panel,
wherein the circumferential direction is in a direction surrounding the structure of the artificial satellite or the structure of the spacecraft.

2. The heat radiator using a heat pipe panel according to claim 1, wherein the outer panel includes a heat radiation surface on a surface thereof.

3. The heat radiator using a heat pipe panel according to claim 1, further comprising:
a webbed panel in which a heat pipe thermally connected to the heat pipes incorporated in the inner panel is built and which is extended from the inner panel in an outer direction.

4. The heat radiator using a heat pipe panel according to claim 3,
wherein the webbed panel has a heat radiation surface from which heat transmitted from the thermally connected heat pipe is radiated.

5. The heat radiator using a heat pipe panel according to claim 3,
wherein a heat pipe thermally connected to the heat pipe built in the webbed panel is built in an outer panel.

6. The heat radiator using a heat pipe panel according to claim 1,
wherein the inner panel is configured by combining panels, the panels having four surfaces or six surfaces.

7. The heat radiator using a heat pipe panel according to claim 1,
wherein the plurality of heat pipes connected in the circumferential direction are built in the inner panel, and
further heat pipes for connection to connect respective heat pipes of the plurality of heat pipes connected in the circumferential direction are built in the inner panel.

8. The heat radiator using a heat pipe panel according to claim 7,
wherein a heat pipe for connection to connect two heat pipes connected in the circumferential direction of the heat pipes for connection to connect respective heat pipes connected in the circumferential direction is bent in a U-shape.

9. The heat radiator using a heat pipe panel according to claim 2,
wherein thermal emissivity changes according to temperature in the heat radiation surface.

10. The heat radiator using a heat pipe panel according to claim 1,
further comprising a loop heat pipe in which a working medium inside the loop heat pipe is allowed to flow when temperature is increased.

11. The heat radiator using a heat pipe panel according to claim 1, wherein at least one heat pipe of the plurality of heat pipes is a linear-shaped heat pipe.

12. A heat radiator using a heat pipe panel comprising:
an inner panel, wherein at least one heat pipe, connected horizontally in a circumferential direction, is incorporated into the inner panel; and
an outer panel surrounding the inner panel;
a webbed panel including a heat pipe thermally connected to the at least one heat pipe incorporated in the inner panel, the webbed panel being extended from the inner panel in an outer direction,
wherein the inner panel is designed to be arrangeable around a structure of an artificial satellite or a structure of a spacecraft, and
wherein an apparatus is mounted on an outer surface of the inner panel facing an inner surface of the outer panel between the inner panel and the outer panel.

* * * * *